United States Patent
Terasaki

(10) Patent No.: US 11,551,071 B2
(45) Date of Patent: Jan. 10, 2023

(54) NEURAL NETWORK DEVICE, SIGNAL GENERATION METHOD, AND PROGRAM

(71) Applicant: TDK CORPORATION, Tokyo (JP)

(72) Inventor: Yukio Terasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 421 days.

(21) Appl. No.: 16/826,691

(22) Filed: Mar. 23, 2020

(65) Prior Publication Data

US 2020/0293889 A1 Sep. 17, 2020

Related U.S. Application Data

(63) Continuation-in-part of application No. PCT/JP2019/000679, filed on Jan. 11, 2019.

(30) Foreign Application Priority Data

Mar. 6, 2018 (JP) .............................. JP2018-040214

(51) Int. Cl.
*G06N 3/063* (2006.01)
*G06N 3/04* (2006.01)
*G06N 3/08* (2006.01)

(52) U.S. Cl.
CPC ............... *G06N 3/063* (2013.01); *G06N 3/04* (2013.01); *G06N 3/08* (2013.01)

(58) Field of Classification Search
CPC ............ G06N 3/063; G06N 3/04; G06N 3/08; G06N 3/0472; G06N 3/0635
See application file for complete search history.

(56) References Cited

U.S. PATENT DOCUMENTS 5,068,661 A * 11/1991 Kaneaki ................ H03M 3/418
341/143
5,353,127 A * 10/1994 Shiau .................... H04N 1/4052
358/465

(Continued)

FOREIGN PATENT DOCUMENTS

JP 2005-515684 A 5/2005
WO 2012/055593 A1 5/2012

(Continued)

OTHER PUBLICATIONS

Wang, Q., et al., "Neuromorphic Processors with Memristive Synapses: Synaptic Interface and Architectural Exploration", ACM Journal on Emerging Technologies in Computing Systems, vol. 12, No. 4, Article 35, May 2016.*

(Continued)

*Primary Examiner* — Xuemei G Chen
(74) *Attorney, Agent, or Firm* — Oliff PLC

(57) ABSTRACT

A neural network device includes a decimation unit configured to convert a discrete value of an input signal to a discrete value having a smaller step number than a quantization step number of the input signal on the basis of a predetermined threshold value to generate a decimation signal a modulation unit configured to modulate a discrete value of the decimation signal generated by the decimation unit to generate a modulation signal indicating the discrete value of the decimation signal, and a weighting unit including a neuromorphic element configured to output a weighted signal obtained by weighting the modulation signal through multiplication of the modulation signal generated by the modulation unit by a weight according to a value of a variable characteristic.

20 Claims, 24 Drawing Sheets

(56) References Cited

U.S. PATENT DOCUMENTS

| | | | | |
|---|---|---|---|---|
| 9,503,116 | B2* | 11/2016 | Speir | H03M 1/462 |
| 2002/0126313 | A1* | 9/2002 | Namizuka | G06T 7/12 |
| | | | | 382/199 |
| 2003/0122692 | A1 | 7/2003 | Roeckner et al. | |
| 2006/0082830 | A1* | 4/2006 | Karito | H04N 1/4058 |
| | | | | 358/3.03 |
| 2013/0006433 | A1* | 1/2013 | Itagaki | H02H 7/26 |
| | | | | 700/292 |
| 2013/0278944 | A1* | 10/2013 | Kubo | H04N 1/405 |
| | | | | 358/1.1 |
| 2016/0323669 | A1* | 11/2016 | Iwata | G10L 21/0208 |
| 2017/0149417 | A1* | 5/2017 | Tachimori | H03M 3/424 |
| 2017/0286829 | A1* | 10/2017 | Chen | G06N 3/063 |
| 2018/0131279 | A1* | 5/2018 | Sun | H02M 3/33515 |
| 2018/0314940 | A1* | 11/2018 | Kundu | G06N 3/0454 |
| 2018/0336469 | A1* | 11/2018 | O'Connor | G06N 3/049 |
| 2020/0210818 | A1* | 7/2020 | Terasaki | G06N 3/08 |
| 2020/0272891 | A1* | 8/2020 | Terasaki | G06N 3/063 |

FOREIGN PATENT DOCUMENTS

| | | |
|---|---|---|
| WO | 2014/041443 A1 | 3/2014 |
| WO | 2016/022241 A1 | 2/2016 |

OTHER PUBLICATIONS

Shinhyun Choi et al. "Data Clustering Using Memristor Networks". Scientific Reports, May 28, 2015, pp. 1-10.
Mohammad Rastegari et al. "Xnor-Net: Imagenet Classification Using Binary Convolutional Neural Networks". 2016, pp. 1-17.
Apr. 16, 2019 International Search Report issued in International Patent Application No. PCT/JP2019/000679.

* cited by examiner

FIG. 3
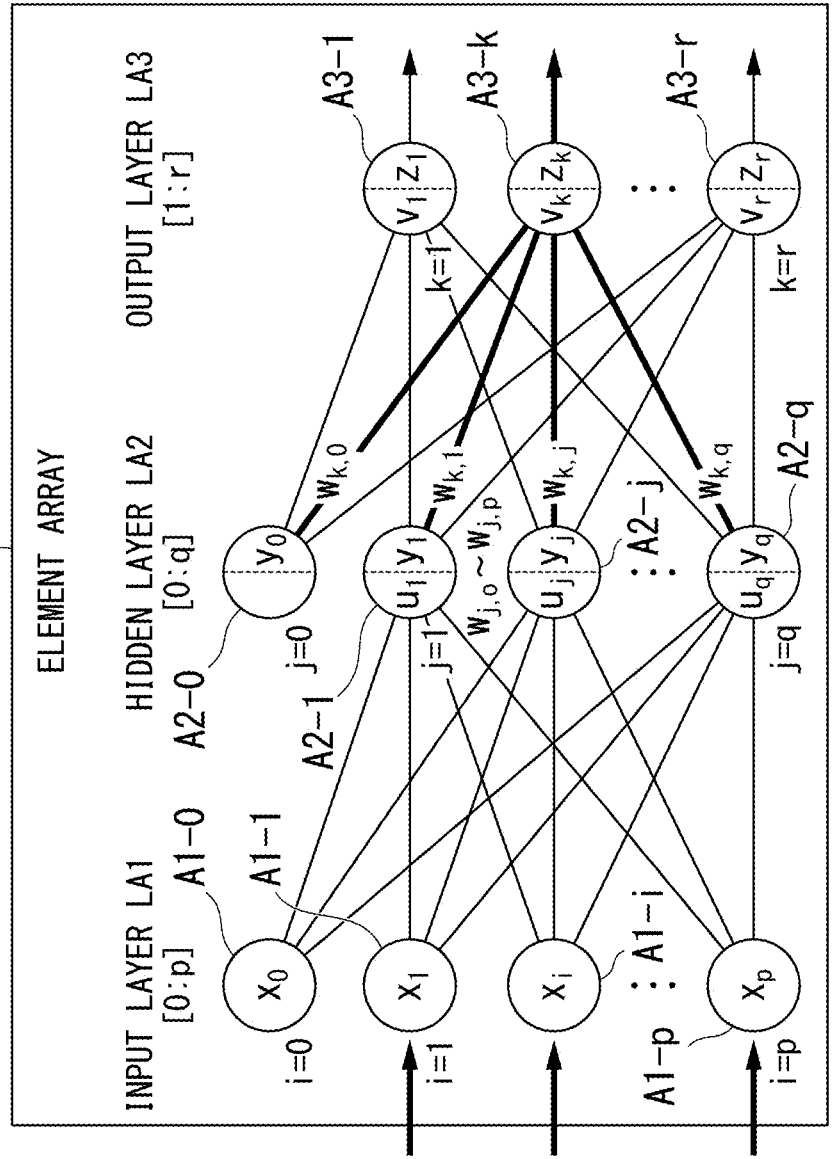
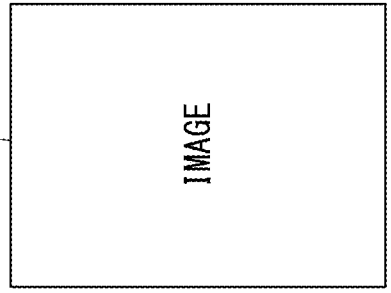

| DECIMATION THRESHOLD VALUE th | INPUT DISCRETE VALUE IDV | POST-DECIMATION DISCRETE VALUE DDV |
|---|---|---|
| th3:192 | 193~255 | 3 |
| th2:128 | 129~192 | 2 |
| th1:64 | 65~128 | 1 |
|  | 0~64 | 0 |

| DECIMATION THRESHOLD VALUE th | INPUT DISCRETE VALUE IDV | POST-DECIMATION DISCRETE VALUE DDV |
|---|---|---|
| th13:160 | 161~255 | 3 |
| th12:128 | 129~160 | 2 |
| th11:96 | 97~128 | 1 |
|  | 0~96 | 0 |

| DECIMATION THRESHOLD VALUE th | INPUT DISCRETE VALUE IDV | POST-DECIMATION DISCRETE VALUE DDV |
|---|---|---|
| th21:128 | 129~255 | 1 |
| | 0~128 | 0 |

NEURAL NETWORK DEVICE, SIGNAL GENERATION METHOD, AND PROGRAM

BACKGROUND OF THE INVENTION

Field of the Invention

The present invention relates to a neural network device, a signal generation method, and a program.

Priority is claimed on Japanese Patent Application No. 2018-040214, filed Mar. 6, 2018, the content of which is incorporated herein by reference.

Description of Related Art

In the related art, a neural network technology has been studied.

An advanced information identification technology and a classification technology using a neural network technology, including deep learning, have been put to practical use in a wide range of fields such as finance, marketing, authentication, and security. In such technologies, an enormous amount of product-sum calculations may be generally required and is often executed using a cloud server or a huge calculator.

In recent years, a new calculation mechanism capable of executing the above-described product-sum calculation at low power and a high speed using a neuromorphic element of which conductance (reciprocal of resistance) changes in an analog manner has been studied. These technologies aim to realize low power consumption and high-speed signal processing by imitating a relationship between neurons and synapses in a recognition process of a human brain. A technology for imitating a structure of a neural network as a static network model and a technology for realizing a neuron firing model from a timing of a spike signal and so on have been widely studied.

As an example, Patent Document 1 discloses a scheme for loading a weight (connection weight) obtained by a real-valued simulation into a circuit chip of a neural network including a discrete value synapse device in a spike-type neural network, and the circuit chip includes a neuromorphic element (see Patent Document 1).

However, when a neuromorphic element is applied to a neural network, an input signal is usually subjected to pulse width modulation (PWM), and therefore, there is one problem in that, when a resolution of the input signal is increased, a calculation time due to the neuromorphic element increases according to this resolution. On the other hand, in the case of a neuromorphic element that modulates an input signal with a voltage or a current value, generally, when a high voltage is applied to the neuromorphic element, a resistance value itself of the element changes or a breakdown of the element is caused. Accordingly, it becomes necessary for a very limited voltage range to be divided into a large number of steps. As a result, there is a problem in that it is necessary to control a pulse voltage with high precision and to achieve a high resolution of a current detection circuit.

PATENT DOCUMENTS

[Patent Document 1] PCT International Publication No. WO2012/055593

SUMMARY OF THE INVENTION

As described above, when a neuromorphic element is used for product-sum calculation in a neural network, there is a problem in that a calculation time increases due to a high resolution of an input signal to the neuromorphic element.

The present invention has been made in view of such circumstances, and an object of the present invention is to provide a neural network device, a signal generation method, and a program capable of curbing an increase in calculation time when neuromorphic elements are used for product-sum calculation in a neural network.

Further, in the present invention, when a neuromorphic element that takes an input signal in which a voltage value or a current value has been modulated is used, simplification of a circuit is expected.

One aspect of the present invention is a neural network device including: a decimation unit configured to convert a discrete value of an input signal to a discrete value having a smaller step number than a quantization step number of the input signal on the basis of a predetermined threshold value to generate a decimation signal; a modulation unit configured to modulate a discrete value of the decimation signal generated by the decimation unit to generate a modulation signal indicating the discrete value of the decimation signal; and a weighting unit including a neuromorphic element configured to output a weighted signal obtained by weighting the modulation signal through multiplication of the modulation signal generated by the modulation unit by a weight according to a value of a variable characteristic.

In one aspect of the present invention, in the neural network device described above, the modulation unit is configured to perform pulse width modulation on the discrete value of the decimation signal generated by the decimation unit to generate a pulse width modulation signal indicating the discrete value of the decimation signal using a pulse width.

In one aspect of the present invention, in the neural network device described above, the modulation unit is configured to perform pulse frequency modulation on the discrete value of the decimation signal generated by the decimation unit to generate a pulse frequency modulation signal indicating the discrete value of the decimation signal using a pulse frequency.

In one aspect of the present invention, in the neural network device described above, the threshold value is determined on the basis of a weighting result of the weighted signal output by the weighting unit.

In one aspect of the present invention, in the neural network device described above, the decimation unit is configured to generate the decimation signals corresponding to a plurality of the respective input signals, and the modulation unit is configured to perform generate the modulation signals corresponding to the plurality of respective decimation signals generated by the decimation unit, with change timings of signal waveforms being different from each other.

In one aspect of the present invention, in the neural network device described above, the threshold value divides the quantization step number of the input signal into ranges having unequal widths.

In one aspect of the present invention, in the neural network device described above, the decimation unit is configured to divide the quantization step number of the input signal into two to generate a binary decimation signal, the modulation unit is configured to generate a binary modulation signal according to the decimation signal, the weighting unit is configured to output the weighted signal obtained by weighting the binary modulation signal, and the neural network device further includes a current detection unit configured to detect a magnitude of a current of the weighted signal that is output by the weighting unit.

In one aspect of the present invention, the neural network device described above further includes a threshold value acquisition unit configured to acquire the threshold value to be used for generation of the decimation signal in the decimation unit.

In one aspect of the present invention, in the neural network device described above, the threshold value is variably determined on the basis of the input signal.

In one aspect of the present invention, in the neural network device described above, a step number of the discrete value of the decimation signal generated by the decimation unit is variably determined on the basis of a value of the input signal in a range of the smaller step number than the quantization step number of the input signal.

One aspect of the present invention is a signal generation method including: a decimation step of converting a discrete value of an input signal to a discrete value having a smaller step number than a quantization step number of the input signal on the basis of a predetermined threshold value to generate a decimation signal; a modulation step of modulating a discrete value of the decimation signal generated in the decimation step to generate a modulation signal indicating the discrete value of the decimation signal; and a weighting step of outputting a weighted signal in which the modulation signal is weighted by a neuromorphic element by multiplying the modulation signal generated in the modulation step by a weight according to a value of a variable characteristic.

One aspect of the present invention is a program for causing a computer included in a neural network device to execute: a decimation step of converting a discrete value of an input signal to a discrete value having a smaller step number than a quantization step number of the input signal on the basis of a predetermined threshold value to generate a decimation signal; a modulation step of modulating a discrete value of the decimation signal generated in the decimation step to generate a modulation signal indicating the discrete value of the decimation signal; and a weighting step of supplying the modulation signal to a neuromorphic element that outputs a weighted signal obtained by weighting the modulation signal through multiplication of the modulation signal generated in the modulation step by a weight according to a value of a variable characteristic, to cause the weighted signal to be output.

According to aspects of the present invention, it is possible to curb an increase in calculation time when neuromorphic elements are used for product-sum calculation in a neural network.

BRIEF DESCRIPTION OF THE DRAWINGS

FIG. 3 is a block diagram illustrating a conceptual configuration of an element array according to the embodiment of the present invention.

DETAILED DESCRIPTION OF THE INVENTION

First Embodiment

Hereinafter, a first embodiment of the present invention will be described with reference to the drawings.

Overview of Neural Network System

Figure 1:
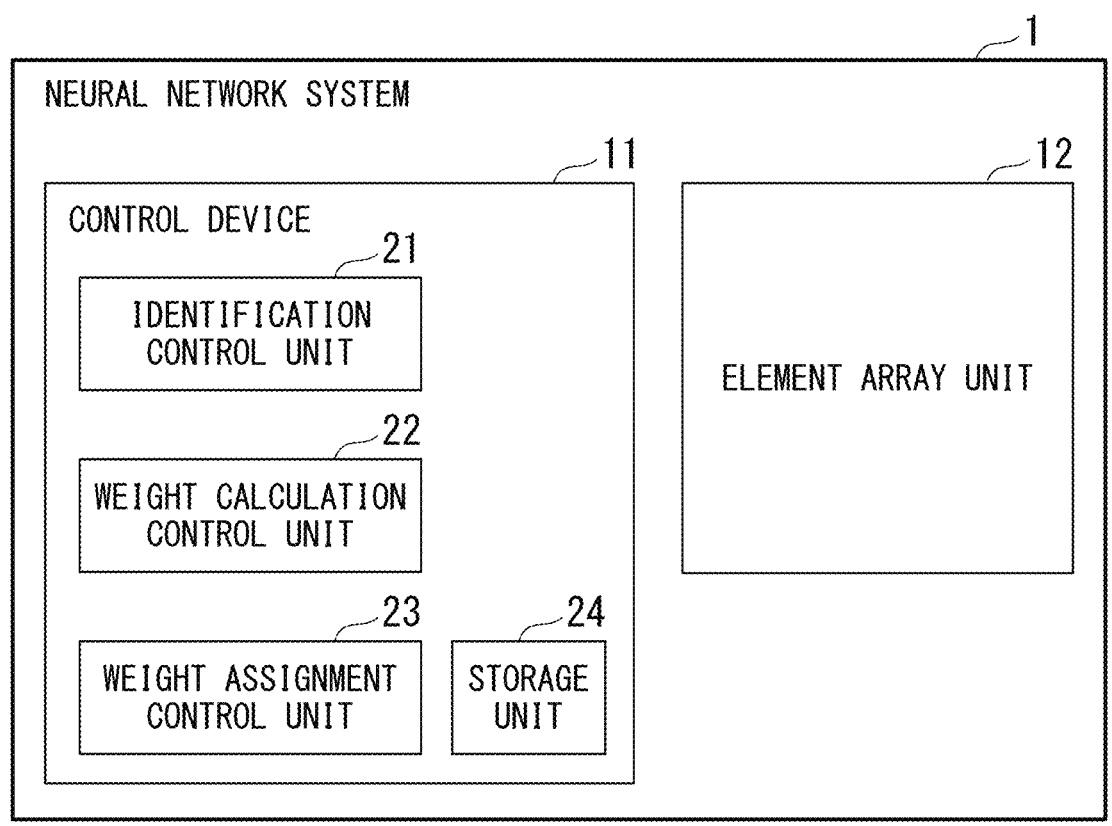
FIG. 1 is a block diagram illustrating a schematic configuration of a neural network system according to an embodiment of the present invention.

FIG. 1 is a block diagram illustrating a schematic configuration of a neural network system 1 according to an embodiment of the present invention.

The neural network system 1 includes a control device 11 and an element array unit 12.

The control device 11 includes an identification control unit 21, a weight calculation control unit 22, a weight assignment control unit 23, and a storage unit 24.

The element array unit 12 performs a product-sum calculation in a neural network. The element array unit 12 includes a neuromorphic element.

The control device 11 performs control regarding the element array unit 12.

The identification control unit 21 controls an identification process in the neural network.

The weight calculation control unit 22 controls a process of calculating (computing) a weight to be assigned to the neuromorphic element.

The weight assignment control unit 23 assigns the weight to the neuromorphic element.

The storage unit 24 stores information.

In the embodiment, one storage unit 24 is shown for convenience of description, but as another example of the configuration, the control device 11 may include two or more storage units and separately use the respective storage units.

Figure 2:
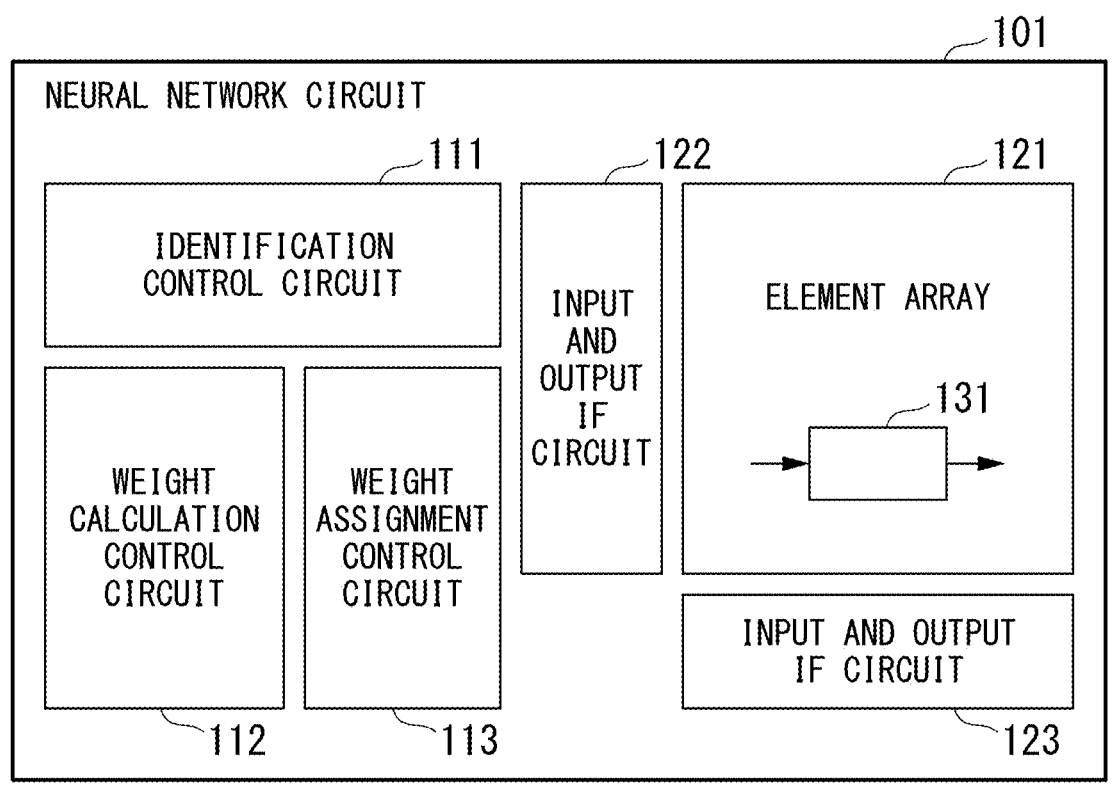
FIG. 2 is a block diagram illustrating a schematic configuration of a neural network circuit according to the embodiment of the present invention.

FIG. 2 is a block diagram illustrating a schematic configuration of the neural network circuit 101 according to the embodiment of the present invention.

The neural network circuit 101 illustrated in FIG. 2 is an example of a circuit in which functions of the neural network system 1 illustrated in FIG. 1 have been realized.

The neural network circuit 101 includes an identification control circuit 111, a weight calculation control circuit 112, a weight assignment control circuit 113, an element array 121, an input and output interface circuit (input and output IF circuit) 122, and an input and output interface circuit (input and output IF circuit) 123.

In examples of FIGS. 1 and 2, a function of the identification control unit 21 is realized by the identification control circuit 111, a function of the weight calculation control unit 22 is realized by the weight calculation control circuit 112, and a function of the weight assignment control unit 23 is realized by the weight assignment control circuit 113. The function of the storage unit 24 is realized by being distributed to each of the identification control circuit 111, the weight calculation control circuit 112, and the weight assignment control circuit 113.

In the examples of FIGS. 1 and 2, functions of the element array unit 12 are realized by the element array 121 and the input and output IF circuits 122 to 123.

The element array 121 includes a plurality of neuromorphic elements.

In the example of FIG. 2, only one neuromorphic element 131 is illustrated inside the element array 121. The neuromorphic element 131 multiplies the input signal by a value of a weight and outputs a signal having a value of a result of the multiplication as an output signal. The value of the weight is a value according to the value of the variable characteristic of the neuromorphic element 131. The value of the characteristics of the neuromorphic element 131 changes under external control.

In the embodiment, a circuit that performs a product-sum calculation corresponding to a desired neural network is configured by using a plurality of such neuromorphic elements in the element array 121. An input of a signal to the element array 121 and an output of a signal from the element array 121 are performed via the input and output IF circuits 122 and 123. A circuit of the element array 121 is, for example, in a matrix shape. Input and output of signals on one side (for example, a vertical side) of the matrix are performed via the input and output IF circuit 122, and input and output of signals on the other side of the matrix (for example, a horizontal side) are performed via the input and output IF circuit 123.

Here, the identification control circuit 111 is connected to the input and output IF circuits 122 and 123, outputs information on an identification target to the element array 121 via the input and output IF circuits 122 and 123, and receives information on a result (identification result) of a calculation performed on the basis of the information by the element array 121 via the input and output IF circuits 122 and 123. The identification control circuit 111, for example, stores the received information (information on the identification result) in the storage unit 24, or executes a predetermined analysis on the basis of the received information (the information on the identification result). The identification control circuit 111 has, for example, a function of performing learning (machine learning) in a neural network that is realized by the element array 121.

The weight calculation control circuit 112 is connected to the identification control circuit 111 and to the weight assignment control circuit 113.

Further, in the embodiment, the weight calculation control circuit 112 has a function of calculating a value of a weight (connection weight) in the neural network that is realized by the element array 121 with higher precision than a resolution of characteristics of the neuromorphic element included in the element array 121. In the embodiment, the weight calculation control circuit 112 has a function of calculating an appropriate weight value to be assigned to the neuromorphic element included in the element array 121 (a value of a weight that satisfies a predetermined condition regarding an error or identification precision in the embodiment).

Further, in the embodiment, the weight calculation control circuit 112 has a function of updating (calculating) the value of the weight to be assigned to the neuromorphic element included in the element array 121 on the basis of the information on the identification result (for example, information on the learning) acquired by the identification control circuit 111.

The weight assignment control circuit 113 is connected to the input and output IF circuits 122 and 123, and sets the value of the weight for the neuromorphic element included in the element array 121 via the input and output IF circuits 122 and 123. The weight assignment control circuit 113 uses the value calculated by the weight calculation control circuit 112 as the value of the weight.

As an example, the weight assignment control circuit 113 may transmit a predetermined signal to the neuromorphic element included in the element array 121 to set the weight value corresponding to the signal for the neuromorphic element. Any signal may be used as the predetermined signal. For example, a voltage pulse signal may be used as the predetermined signal.

In the neuromorphic element, the characteristics (conductance in the embodiment) of the neuromorphic element are changed such that the weight value is changed under control of the weight assignment control circuit 113. That is, the neuromorphic element multiplies the input signal by a weight (value) according to the characteristics of the neuromorphic element and outputs a signal resulting from the multiplication.

As a specific example, when a neuromorphic element of which resistance R can be changed is used as a function of a multiplier, conductance G (=1/R) of the neuromorphic element is used, a voltage V is received as the input signal in the neuromorphic element, and a magnitude of a current I (=G×V) flowing through the neuromorphic element in this case is used as a multiplication result.

In a configuration in which a plurality of neuromorphic elements are included in the element array 121, for example, control may be performed for each of the neuromorphic elements, control may be collectively performed for all of the neuromorphic elements, or a plurality of neuromorphic elements may be divided into two or more different groups and control may be collectively performed for the respective groups.

Here, when a neuromorphic element of which a change amount of the characteristics fluctuates is used, it is preferable for the neuromorphic element to be controlled in consideration of this point. The fluctuation in the change amount of the characteristics indicates, for example, an element in which the change in the characteristics is non-linear.

As a specific example, in a neuromorphic element of which an amount of change in conductance ($\Delta G$) fluctuates, for example, the amount of change in conductance ($\Delta G$) with respect to a constant amount of change in the voltage V to be applied to the neuromorphic element may increase as a value of the conductance changes from a small value to a great value.

In this case, as an example, a configuration in which the amount of change (the amount of change in each switching step) in voltage V to be applied to the neuromorphic element is decreased as the value of the conductance changes from the small value to the great value in order to switch the amount of change in conductance ($\Delta G$) of the neuromorphic element at regular intervals may be used. Alternatively, a configuration in which a change amount of the weight to be assigned fluctuates according to the fluctuation in a change amount $\Delta$ of the conductance may be used.

Even when the change amount of the characteristics of the neuromorphic element fluctuates in another aspect, the control may be performed according to that aspect. Such a control method, for example, may be set in advance and stored in the storage unit 24 or the like.

FIG. 3 is a block diagram illustrating a conceptual configuration of the element array 121 according to the embodiment of the present invention.

Here, in the example of FIG. 3, a state of the product-sum calculation that is performed in the element array 121 is conceptually shown. As a circuit configuration of the element array 121, any circuit configuration in which such a product-sum calculation is realized may be used.

The example of FIG. 3 illustrates an example using a three-layer perceptron.

The element array 121 receives p (p is an integer equal to or greater than 1) values (signals) and outputs r (r is an integer equal to or greater than 1) values (signals).

The element array 121 includes p units A1-1 to A1-$p$ and one unit A1-0 of a bias term in an input layer LA1.

The element array 121 includes q units A2-1 to A2-$q$ and one unit A2-0 of a bias term in a hidden layer LA2.

The element array 121 includes r units A3-1 to A3-$r$ in an output layer LA3.

In the embodiment, a circuit that performs a calculation that is realized by the p units A1-1 to A1-$p$, the q units A2-1 to A2-$q$, and the r units A3-1 to A3-$r$ is configured using a neuromorphic element. This calculation is, for example, a product-sum calculation.

Although a configuration of the neural network that outputs the signals from the respective units in the preceding layer to all the units in the subsequent layer (other than the unit of the bias term) is shown in the embodiment, other configurations may be used. In the example of FIG. 3, signals are output by the units A1-0 to A1-$p$ in the input layer LA1 to the q units A2-1 to A2-$q$ in the hidden layer LA2, and signals are output by the respective units A2-0 to A2-$q$ in the hidden layer LA2 to the r units A3-1 to A3-$r$ in the output layer LA3.

The respective units A1-1 to A1-$p$ in the input layer LA1 receive and output p input values (signals).

Further, the unit A1-0 in the input layer LA1 outputs a predetermined value (signal).

The respective units A2-1 to A2-$q$ in the hidden layer LA2 output a value (signal) of a result of performing a product-sum calculation on output values (signals) from the (p+1) units A1-0 to A1-$p$ in the input layer LA1 using a predetermined weight to the respective units A3-1 to A3-$r$ in the output layer LA3. This product-sum calculation is performed between an output of the input layer LA1 and an output of the hidden layer LA2. The weight, for example, may be different for each of the units A1-1 to A1-$p$ in the input layer LA1, or may be different for the respective units A2-1 to A2-$q$ in the hidden layer LA2.

Further, the unit A2-0 in the hidden layer LA2 outputs a predetermined value (signal).

The respective units A3-1 to A3-$q$ in the output layer LA3 output a value (signal) of a result of performing a product-sum calculation on the output values (signals) from the (q+1) units A2-0 to A2-$q$ in the hidden layer LA2 using a predetermined weight. This product-sum calculation is performed between the output of the hidden layer LA2 and an output of the output layer LA3. The weight, for example, may be different for the respective units A2-1 to A2-$q$ in the hidden layer LA2, and may be different for the respective units A3-1 to A3-$r$ in the output layer LA3.

The element array 121 receives an image 211 and outputs information on the identification result of the received image 211.

As an example, the image 211 is an image having 784 pixels (0th to 783rd pixels). In this case, the number (p) of units of the input layer LA1 is 784.

Further, in the example of FIG. 3, the information on the identification result is r pieces of information output by the output layer LA3.

When a neural network including a plurality of layers is configured, a weight corresponding to between the respective layers (for example, between a first layer and a second layer and between the second layer and a third layer) is formed, for example, using a separate array for each between the layers (for example, an array having an arrangement of a plurality of neuromorphic elements for each between layers), or a configuration in which a set of arrays (for example, a set of arrays having an arrangement of a plurality of neuromorphic elements) is virtually divided according to a time difference (time division) or the like so that a weight corresponding to between two or more layers is realized may be used.

Further, a configuration in which one set of arrays is spatially divided into a plurality of sub-arrays so that weights corresponding to between two or more layers are realized may be used.

Similarly, in the embodiment, one neuromorphic element, for example, may be used in correspondence to one weight, or may be virtually divided according to a time difference (time division) or the like and used in correspondence to two or more weights.

Figure 4:
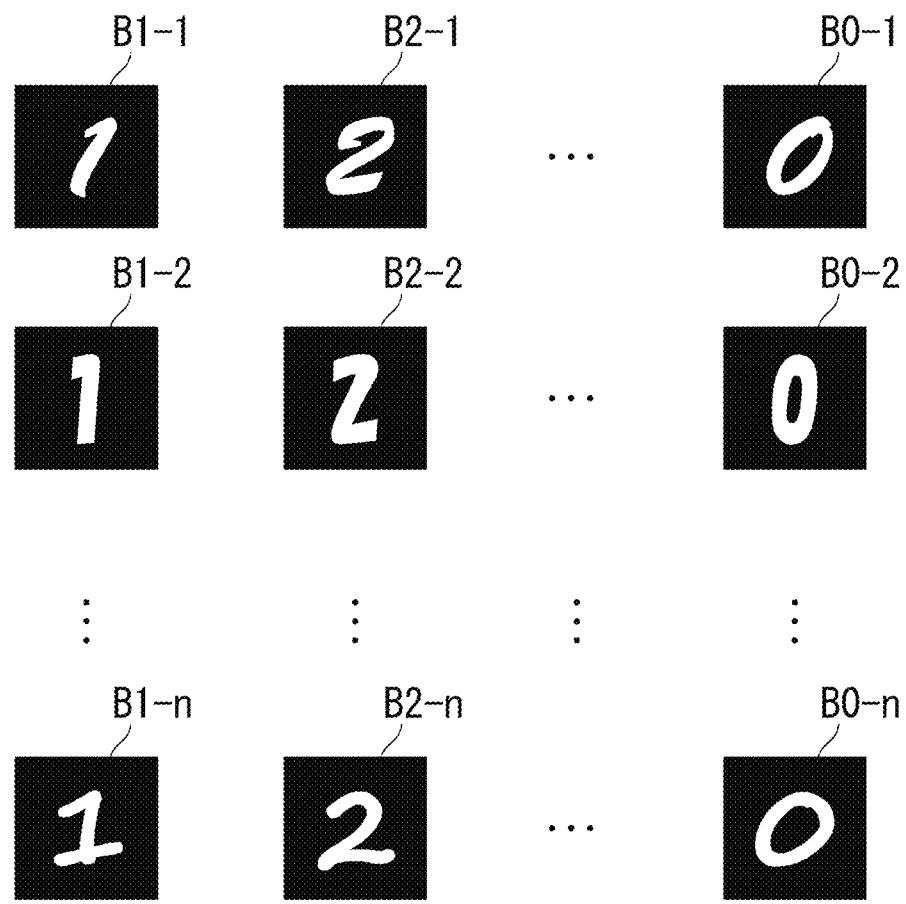
FIG. 4 is a diagram illustrating an example of an image of an identification target according to the embodiment of the present invention.

FIG. 4 illustrates an example of images B1-1 to B1-$n$, B2-1 to B2-$n$, B0-1 to B0-$n$ (n is an integer equal to or greater than 2, such as a sufficiently great number) of identification targets according to the embodiment of the present invention.

The images B1-1 to B1-$n$ are images with a plurality of different handwritten patterns when the numeral "1" is handwritten.

The images B2-1 to B2-$n$ are images with a plurality of different handwritten patterns when the numeral "2" is handwritten.

The images B0-1 to B0-$n$ are images with a plurality of different handwritten patterns when the numeral "0" is handwritten.

In the example of FIG. 4, the numerals "3" to "9" are not illustrated.

Further, although the same number (n) of images are shown for all of the numerals "1" to "9" and "0" in the example of FIG. 4, a different number of images may be used for each numeral.

In the element array 121 illustrated in FIG. 3, when images with the numerals "1" to "9" and "0" are used, for example, 10 is used as the number (r) of outputs from the output layer LA3. The identification control unit 21 assigns the ten outputs to the respective 10 numerals ("1" to "9" and "0") and regards values of the respective outputs as likelihoods (possibility) of being the respective numerals. In the identification control unit 21, a numeral of the received image 211 is identified as a numeral corresponding to the output having the greatest value among the 10 outputs.

Although a configuration in which a greater value of the output corresponds to a higher likelihood has been adopted here, a configuration in which, conversely, the greater value of the output corresponds to a lower likelihood may be adopted.

In the embodiment, a case in which an image of the Mixed National Institute of Standards and Technology database (mnist) is used as an example of such an image is shown.

The image illustrated in FIG. 4 is not an image of mnist itself, but is an example of an image indicating a handwritten numeral for convenience of description.

Here, any element may be used as the neuromorphic element. Further, as the neuromorphic element, for example, a plurality of one type of the neuromorphic elements may be used in combination or two or more types of the neuromorphic elements may be used in combination.

As an example, an element using a phase change memory (PCM) that controls a phase change between crystalline and amorphous in a stepwise manner may be used as the neuromorphic element.

As another example, an element using a conductive bridge RAM (CBRAM) that uses formation and annihilation of a path between metal deposition and ionization according to an electrochemical reaction may be used as a neuromorphic element.

As another example, an element using spintronics is also used as a neuromorphic element. For example, a domain wall type element that generates a linear resistance change through control of a magnetic wall or a spin orbit torque (SOT) type element using magnetization reversal according to an action of a spin orbit torque has been studied.

As another example, an element using a resistant random access memory (ReRAM) that forms a filament through metal deposition on a medium such as $TaO_2$ and uses a resistance change may be used as the neuromorphic element.

In the embodiment, a neuromorphic element in which a value of conductance as a characteristic of the element can be changed is used, and a resolution of the change is finite.

An element in which any characteristic can be changed may be used as the neuromorphic element. For example, an element in which a characteristic such as a resistance or an optical phase can be changed may be used.

[Influence of Resolution of Characteristics of the Neuromorphic Element on Performance]

An influence on performance of a neural network when the neuromorphic element with a finite resolution is applied to the neural network will be described.

The neuromorphic element does not have a complete analog linear conductance (G) change characteristic and has a finite resolution. When the resolution (the number of bits in the embodiment) of the conductance change of the neuromorphic element is determined, a dynamic range (an overall width) of a value is proportional to a quantization step size (a width of a quantization step).

Here, when the quantization step size is increased, performance of the neural network is expected to be degraded. Therefore, this can be thought of as a problem of optimization of the dynamic range to be given to the neuromorphic element.

Here, a condition that the resolution is fixed is assumed. It is conceivable that an influence on the identification performance can be changed according to the dynamic range (a value range) to be assigned to the neuromorphic element of each layer.

Here, a transition of convergence of a weight using a real number represented by a double-precision floating point is considered. The weight in each layer is realized by controlling a variable conductance of the neuromorphic element.

In the embodiment, since a simulation using a real number is executed using a computer, the term "real number" in the simulation is not strictly a real number, but is a value discretized according to a restriction of a calculation word length of the computer.

For example, a graph in which a maximum value, a minimum value, and an average value of the weight in a first layer and a maximum value, a minimum value, and an average value of the weight in a second layer are represented is considered (illustration will be omitted).

When the weight was converted to a model of the neuromorphic element, the resolution of the characteristics of the neuromorphic element was assumed to be 5 (5 steps). Assuming a plurality of types of different combinations as the dynamic range of the neuromorphic element, the identification performance was evaluated. When the resolution of the characteristics of the neuromorphic element is fixed, the identification performance can greatly change depending on how the dynamic range is assigned.

An identification result in real number calculation is as follows. Here, (±U, ±V) indicates that the dynamic range of the weight in the first layer is ±U and the dynamic range of the weight in the second layer is ±V. Further, W [%] indicates precision of the identification result (identification precision).

| | |
|---|---|
| (±2, ±2) | 76.92 [%] |
| (±1, ±2) | 83.41 [%] |
| (±2, ±1) | 72.02 [%] |
| (±1, ±1) | 84.90 [%] |
| (±0.5, ±0.5) | 94.88 [%] |
| (±0.5, ±0.3) | 91.45 [%] |
| (±0.3, ±0.5) | 94.01 [%] |
| (±0.3, ±0.3) | 89.81 [%] |
| (±0.1, ±0.1) | 69.46 [%] |
| (±0.05, ±0.05) | 57.09 [%] |

The following can be estimated from these results.

As one estimation result, as the dynamic range to be assigned to the neuromorphic element, use of theoretical values of the upper limit and the lower limit may not be optimal, and a smaller dynamic range may be advantageous.

It is conceivable that it is important for the quantization step size to be small, but it is conceivable that there is an optimal value.

As another estimation result, it may be advantageous to set the quantization step size in the first layer to be smaller than the quantization step size in the second layer.

In general, in a neural network including M (M is assumed to be an integer equal to or greater than 2) layers, the first layer to the N-th (N is an integer equal to or greater than 1 and less than M) layer are relevant to feature extraction, and the (N+1)-th layer to the M-th layer are relevant to identification. The identification may depend on a result of the feature extraction. When the performance of feature extraction is good, it is possible to maintain performance of the identification to a certain level of good performance. It was estimated that the resolution was more significant in the upper layer and a large dynamic range was required for the lower layer.

Based on this, in the embodiment, the resolution of the characteristics of the neuromorphic element is fixed and is treated as an issue of optimization of the dynamic range to be assigned to the neuromorphic element and the quantization step size.

Normally, in a neuromorphic element, when the quantization step size decreases, an error of the weight decreases, and a dynamic range of a value that the weight can take decreases. Further, in the neuromorphic element, when the dynamic range decreases, a possibility of a value calculated using an original weight value being fixed to the upper limit or the lower limit increases, which causes erroneous identification. In the embodiment, a good solution (preferably, an optimal solution) is obtained, as will be described below.

Overview of Calculation of Identification Precision in Neural Network

A neural network assumed in the embodiment will be described. In the embodiment, the neural network illustrated in FIG. 3 is assumed.

The number of units in the input layer LA1 is p, and one unit of the bias term is also provided.

The number of units in the hidden layer LA2 is q, and one unit of the bias term is also provided.

The number of units in the output layer LA3 is r.

For a weight $w^{(L)}_{s,t}$, L denotes a layer number, s denotes a number of a unit of a layer on the output side, and t denotes a number of a unit of a layer on the input side. Here, in the embodiment, a first layer (L=1) is between the input layer LA1 and the hidden layer LA2, and a second layer (L=2) is between the hidden layer LA2 and the output layer LA3.

The bias term was represented by a zero-order term in the calculation of back propagation. An output value of the bias term was always set to 1, and a weight between the bias term and each unit was also set as a learning target.

Hereinafter, an influence of the resolution of the weight, the dynamic range, and the quantization step size on the identification performance will be described.

An influence of the error of the weight on output is shown.

$x_i$ (i=0, 1, 2, . . . , p) is the bias term and the output value (the same value as the input value in the embodiment) in the input layer LA1, and $y_j$ (j=0, 1, 2, . . . , q) is the bias term and the output value in the hidden layer LA2.

As shown in Equation (1), a quantization error (a term with a sign Δ) caused by restrictions on the resolution of the weight $w^{(2)}_{k,j}$ in the second layer is introduced.

An output value $z_k$ (k=1, 2, . . . , r) from the neural network is expressed as in Equation (2).

$$w^{(2)}_{k,j} = \dot{w}^{(2)}_{k,j} + \Delta w^{(2)}_{k,j} \quad (1)$$

$$z_k = \sum_{j=0}^{q} w^{(2)}_{k,j} \cdot y_j \ (k = 1, \ldots, r) \quad (2)$$

$$= \sum_{j=0}^{q} (\dot{w}^{(2)}_{k,j} + \Delta w^{(2)}_{k,j}) \cdot y_j \ (k = 1, \ldots, r)$$

Next, an error $y_j$ is considered. When a rectified linear unit (relu) is used as an activation function, the error is expressed as in Equation (3) and Equation (4).

$$y_j = u_j(u_j \geq 0) \quad (3)$$
$$y_j = 0(u_j < 0)$$

$$u_j = w^{(1)}_{j,0} \cdot x_0 + w^{(1)}_{j,1} \cdot x_1 + w^{(1)}_{j,2} \cdot x_2 + \ldots + w^{(1)}_{j,p} \cdot x_p \quad (4)$$

$$= \sum_{i=0}^{p} w^{(1)}_{j,i} \cdot x_i \ (j = 1, \ldots, q)$$

A quantization error (a term with a sign Δ) caused by a restriction on the resolution of the weight $w^{(1)}_{j,i}$ in the first layer is introduced, as in Equation (1). Thereby, $u_j$ is expressed as in Equation (5).

$$u_j = \sum_{i=0}^{p} w^{(1)}_{j,i} \cdot x_i \ (j = 1, \ldots, q) \quad (5)$$

$$= \sum_{i=0}^{p} (\dot{w}^{(1)}_{j,i} + \Delta w^{(1)}_{j,i}) \cdot x_i \ (j = 1, \ldots, q)$$

Therefore, an equation taking an error of the output value $z_k$ (k=1, 2, . . . , r) from the neural network into account is expressed as in Equation (6).

Here, when $u_j<0$, the output becomes 0, and therefore, this equation is established identically.

$$z_k = \sum_{j=0}^{q} (\dot{w}_{k,j}^{(2)} + \Delta w_{k,j}^{(2)}) \cdot y_j \quad (6)$$

$$= \sum_{j=0}^{q} \left[ (\dot{w}_{k,j}^{(2)} + \Delta w_{k,j}^{(2)}) \cdot \sum_{i=0}^{p} (\dot{w}_{j,i}^{(1)} + \Delta w_{j,i}^{(1)}) \cdot x_i \right]$$

When only the component ($\Delta z_k$) of the error of the output value $z_k$ ($k=1, 2, \ldots, r$) from the neural network is extracted, the component ($\Delta z_k$) is expressed as in Equation (7).

$$\Delta z_k = \sum_{j=0}^{q} \left\{ \dot{w}_{k,j}^{(2)} \cdot \sum_{i=0}^{p} \Delta w_{j,i}^{(1)} \cdot x_i + \Delta w_{k,j}^{(2)} \cdot \sum_{i=0}^{p} \dot{w}_{j,i}^{(1)} \cdot x_i + \Delta w_{k,j}^{(2)} \cdot \sum_{i=0}^{p} \Delta w_{j,i}^{(1)} \cdot x_i \right\} \quad (7)$$

$$= \sum_{j=0}^{q} \dot{w}_{k,j}^{(2)} \cdot \sum_{i=0}^{p} \Delta w_{j,i}^{(1)} \cdot x_i + \sum_{j=0}^{q} \Delta w_{k,j}^{(2)} \cdot \sum_{i=0}^{p} \dot{w}_{j,i}^{(1)} \cdot x_i + \sum_{j=0}^{q} \Delta w_{k,j}^{(2)} \cdot \sum_{i=0}^{p} \Delta w_{j,i}^{(1)} \cdot x_i$$

Here, $\alpha$ and $\beta$ are introduced as parameters, and conversion shown in Equation (8) is performed.

$\alpha$ and $\beta$ are assumed to form a uniform probability distribution satisfying the condition shown in Equation (9).

The error component ($\Delta z_k$) of the output value $z_k$ ($k=1, 2, \ldots, r$) from the neural network is expressed as in Equation (10).

$$\Delta w_{j,i}^{(1)} = \alpha \cdot \dot{w}_{j,i}^{(1)} \quad (8)$$
$$\Delta w_{k,j}^{(2)} = \beta \cdot \dot{w}_{k,j}^{(2)}$$

$$|\alpha| \ll 1, |\beta| \ll 1 \quad (9)$$

$$\Delta z_k = \sum_{j=0}^{q} \left\{ \dot{w}_{k,j}^{(2)} \cdot \sum_{i=0}^{p} \Delta w_{j,i}^{(1)} \cdot x_i + \Delta w_{k,j}^{(2)} \cdot \sum_{i=0}^{p} \dot{w}_{j,i}^{(1)} \cdot x_i + \Delta w_{k,j}^{(2)} \cdot \sum_{i=0}^{p} \Delta w_{j,i}^{(1)} \cdot x_i \right\} \quad (10)$$

$$= \sum_{j=0}^{q} \dot{w}_{k,j}^{(2)} \cdot \sum_{i=0}^{p} \alpha \cdot \dot{w}_{j,i}^{(1)} \cdot x_i + \sum_{j=0}^{q} \beta \cdot \dot{w}_{k,j}^{(2)} \cdot \sum_{i=0}^{p} \dot{w}_{j,i}^{(1)} \cdot x_i + \sum_{j=0}^{q} \beta \cdot \dot{w}_{k,j}^{(2)} \cdot \sum_{i=0}^{p} \alpha \cdot \dot{w}_{j,i}^{(1)} \cdot x_i$$

Here, when a term on the rightmost side of Equation (10) is evaluated, elements of all product-sum calculation terms are the same, and the third term (the term in which both $\alpha$ and $\beta$ are included) is smaller than the first term (the term in which $\alpha$ is included) and the second term (the term in which $\beta$ is included) in consideration of Equation (9).

Considering this, the error component is expressed as in Equation (11).

$$\Delta z_k \approx \sum_{j=0}^{q} \dot{w}_{k,j}^{(2)} \cdot \sum_{i=0}^{p} \alpha \cdot \dot{w}_{j,i}^{(1)} \cdot x_i + \sum_{j=0}^{q} \beta \cdot \dot{w}_{k,j}^{(2)} \cdot \sum_{i=0}^{p} \dot{w}_{j,i}^{(1)} \cdot x_i \quad (11)$$

Equation (11) shows that a fluctuation in the output due to the quantization error of the weight in each layer is calculated as a sum of a sum of influences of the quantization error in the first layer and a sum of influences of the quantization error in the second layer. Thereby, it is conceivable that a reduction (preferably, minimization) in an output error is realized by applying a solution that decreases (preferably, minimizes) an error after quantization (for example, a square error).

Here, the identification precision can be represented by, for example, a value of ($1/\Delta z_k$) or a value proportional thereto.

In the embodiment, the element array 121 includes one neuromorphic element for each combination of j and i with respect to the weight $w^{(1)}_{j,i}$ in the first layer.

Similarly, in the embodiment, the element array 121 includes one neuromorphic element for each combination of k and j with respect to the weight $w^{(2)}_{k,j}$ in the second layer.

When there are two or more weight calculations that can be shared, neuromorphic elements may be shared as one neuromorphic element for the two or more weight calculations.

A scheme for obtaining the values of the two parameters $\alpha$ and $\beta$ will be described.

As an example, a scheme for calculating a value indicating a predetermined error by variously changing the values of the two parameters $\alpha$ and $\beta$ and obtaining values of the parameters $\alpha$ and $\beta$ in which the value indicating the error is decreased (preferably, minimized) may be used. In this scheme, for example, the values of the two parameters $\alpha$ and $\beta$ may be changed in a round robin manner. An appropriate dynamic range to be set for the neuromorphic element is determined by determining appropriate values of the parameters $\alpha$ and $\beta$.

A condition that predetermined identification precision is increased (preferably, maximized) may be used instead of a condition that the value indicating the predetermined error is decreased (preferably, minimized).

As another example, when there is a scheme for analytically obtaining the values of the two parameters $\alpha$ and $\beta$, the analytical scheme may be used.

Here, the values of the two parameters $\alpha$ and $\beta$ can change depending on, for example, the number or content of identification targets.

In general, in the configuration of the neural network, the input layer has a unit corresponding to each pixel of image data of an identification target, and the number of units decreases toward the hidden layer and the output layer.

As an example, in identification of a test set (a combination of images for a test) of mnist, a dimension of the input layer LA1 is 784 units, a dimension of the hidden layer LA2 is 100 units, and a dimension of the output layer LA3 is ten units, thereby achieving identification performance of 97 [%] or more in a real number calculation.

When the resolution and the dynamic range to be assigned to the neuromorphic element have been determined, the parameters $\alpha$ and $\beta$ regarding the quantization error are generated from the following two elements.

(Element 1) There is an element called a pure quantization error generated by the quantization step size. This is a distribution in which an amount corresponding to (quantization step size/2) is minimized and maximized.

(Element 2) When the dynamic range to be assigned is narrower than a range according to a real number calculation value, there is an element called a truncation error that is generated with a value (real number calculation value) exceeding the dynamic range to be assigned.

Thus, it is conceivable that an error of an output can be curbed by determining the dynamic range to be assigned to the neuromorphic element so that a sum of errors in each layer is decreased (preferably, minimized) when the resolution of the characteristics of the neuromorphic element is fixed.

A condition that predetermined identification precision is increased (preferably, maximized) may be used instead of the condition that the value indicating the predetermined error is decreased (preferably, minimized).

Distribution of Parameters α and β

Figure 5:
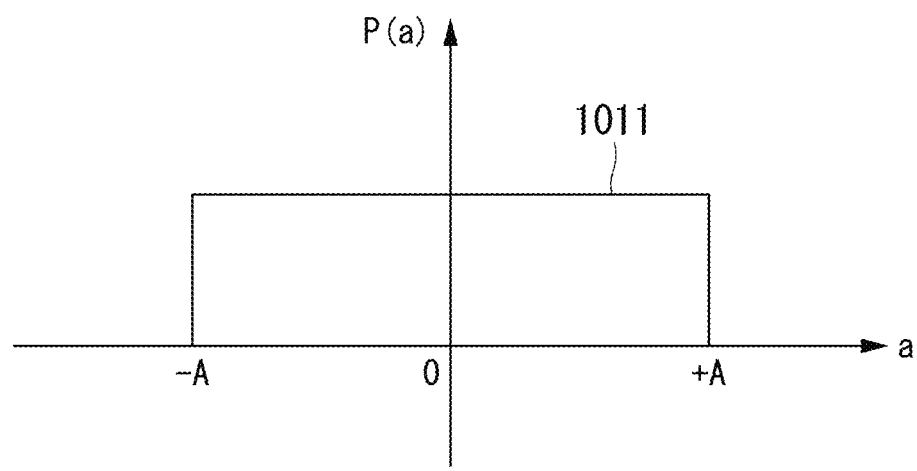
FIG. 5 is a diagram illustrating an example of characteristics regarding parameters α and β according to the embodiment of the present invention.

FIG. 5 is a diagram illustrating an example of a characteristic 1011 regarding the parameters α and β according to the embodiment of the present invention.

In a graph illustrated in FIG. 5, a horizontal axis indicates parameter a, and a vertical axis indicates the function P(a). In the example of FIG. 5, a characteristic 1011 is shown. The characteristic 1011 is a characteristic in which A is a predetermined positive value and becomes a constant value from a=−A to a=+A. Here, it is general for the weight in the neural network to be initialized at a normal random number or the like, and for the value of the weight to be assumed to be uniformly distributed. In this case, the quantization error is also assumed to be uniformly distributed. This assumption is an example, and the embodiment does not necessarily depend on a distribution shape of the quantization error. Further, the characteristic 1011 is a probability density function in which an overall probability is 1.

Here, (2×A) is the quantization step size, and there is a relationship of {(2×A)×resolution=dynamic range}.

Since the parameter α and the parameter β indicate a ratio of the error component to the true value of the weight from Equation (8), the parameter α and the parameter β are equivalent to (2×A)/dynamic range width when the parameter α and the parameter β are positive values. That is, the parameter α and the parameter β are values corresponding to the quantization step size.

Here, for convenience of description, the two parameters α and β are described using a common letter A, but the values of the two parameters α and β are made different in the embodiment.

First Example of Procedure for Assigning Dynamic Range to Neuromorphic Element (Procedure 1 in the first example) to (Procedure 8 in the first example) will be described as a first example of a procedure for assigning a dynamic range to a neuromorphic element. An order of the procedure may be varied as long as the same results can be obtained.

In this example (first example), a method of performing calculation on the basis of the quantization error of the weight of each layer is used as an example of the calculation method.

In this example, the user operates the computer and performs the following procedure using the computer. Some or all of the operations to be performed by the user may be automatically performed by the computer.

Here, in the embodiment, such a computer is, for example, a computer included in the neural network circuit 101, and is, for example, a computer included in the weight calculation control circuit 112. As another example, a computer separate from the neural network circuit 101 may be used as such a computer. The computer may be a microcomputer, for example.

Further, in the description of the example, it is assumed that such a computer has a function of a predetermined real number simulator, and the real number simulator executes processes of (Procedure 1 in the first example) to (Procedure 8 in the first example). These processes may be performed by, for example, a function other than the real number simulator, or may be performed by any function (in general, two or more different functions) for each process. Further, the processes may be performed by, for example, any computer (in general, two or more different computers) for each process.

(Procedure 1 in the first example) The user defines a structure of the neural network in the real number simulator. Here, examples of the structure of the neural network include a type, the number of layers, a layer structure, and the number of units. Further, in the example, the real number simulator is realized using a computer, and executes a numerical calculation of a simulation in the defined neural network using a real number.

(Procedure 2 in the first example) Using the real number simulator, the user performs learning of the neural network using learning data to obtain the true value of the weight. Here, the true value of the weight is, for example, a value of the weight when a function indicating a predetermined error has converged. Any function may be used as the function indicating the predetermined error. Further, any data may be used as the learning data.

(Procedure 3 in the first example) The user determines a range of the quantization step size for searching for an optimal solution and sets the range in the real number simulator. As a specific example, when the range of the true value of the weight is −1 to +1 and the resolution of the characteristics of the neuromorphic element is 5, the quantization step size becomes 0.4 (=2/5) when these values are used. For example, the search range is set to 0.04 to 4.

(Procedure 4 in the first example) Using the real number simulator, the user sets {(quantization step size× resolution)=(dynamic range of weight to be assigned to neuromorphic element)} and calculates a value of a weight obtained by discretizing the true value of the weight with a resolution.

(Procedure 5 in the first example) Using the real number simulator, the user calculates a function regarding an error. As an example, a function in which a result of adding an error between the discretized weight value and the true value to all weights is an overall error (hereinafter also referred to as an error sum) may be used as the function regarding the error. As another example, a function in which a result of adding a square value of the error between the discretized weight value and the true value to all the weights is the overall error (hereinafter also referred to as an error square sum) may be used as the function regarding the error.

(Procedure 6 in the first example) Using the real number simulator, the user determines the value of the quantization step size in which the value of the function regarding the error (an error sum or an error square sum in the embodiment) is minimized. Here, for example, a scheme for selecting one value from a plurality of value candidates and determining the value may be used as a scheme for determining the value of the quantization step size.

Although an aspect in which the value of the quantization step size in which a value of an error (a value of the function regarding the error) is minimized is determined may be used as an example of a preferable aspect in the example, an aspect in which the value of the quantization step size in which the value of the error (the value of the function regarding the error) is decreased is determined on the basis of a predetermined condition may be used as another example. Any condition may be used as the predetermined condition. For example, a condition that the value of the error (the value of the function regarding the error) is equal to or less than a predetermined threshold value (or less than the predetermined threshold value) may be used.

(Procedure 7 in the first example) Using the real number simulator, the user adopts the determined value of the quantization step size, sets {(quantization step size×resolution)=(dynamic range of weight assigned to neuromorphic element)}, and assigns the dynamic range to the neuromorphic element. As a specific example, when the quantization step size is 0.25 and the resolution is 5, the dynamic range is 1.25 (=0.25×5).

(Procedure 8 in the first example) Using the real number simulator, the user converts the dynamic range to be assigned to the neuromorphic element to a range centered on 0 (a lower limit value Wmin to an upper limit value Wmax). Here, since the range is centered on 0, |Wmin|=|Wmax|. Z is any value, and |Z| indicates the absolute value of Z. Further, using the real number simulator, the user sets a value Gmin of the conductance corresponding to the lower limit value Wmin of the dynamic range as a value of the conductance of the neuromorphic element and sets a value Gmax of the conductance corresponding to the upper limit value Wmax of the dynamic range.

Second Example of Procedure for Assigning Dynamic Range to Neuromorphic Element (Procedure 1 in the second example) to (Procedure 5 in the second example) will be described as a second example of the procedure for assigning the dynamic range to the neuromorphic element. The order of the procedure may be made different when the same results are obtained.

In this example (second example), a calculation method using the identification precision is used as another example of the calculation method. As another example, a method of performing a calculation on an output of a final step using a sum of the errors or a sum of squares of the errors may be used.

In this example, the user operates the computer and performs the following procedure using the computer. Some or all of the operations to be performed by the user may be automatically performed by the computer.

Here, in the embodiment, such a computer is, for example, a computer included in the neural network circuit 101, and is, for example, a computer included in the weight calculation control circuit 112. As another example, a computer separate from the neural network circuit 101 may be used as such a computer.

Further, in the description of the example, it is assumed that such a computer has a function of a predetermined real number simulator, and the real number simulator executes processes of (Procedure 1 in the second example) to (Procedure 5 in the second example). These processes may be performed by, for example, a function other than the real number simulator, or may be performed by any function (in general, two or more different functions) for each process.

Further, the processes may be performed by, for example, any computer (in general, two or more different computers) for each process.

(Procedure 1 in the second example) is the same as (Procedure 1 in the first example).

(Procedure 2 in the second example) is the same as (Procedure 2 in the first example).

(Procedure 3 in the second example) Using the real number simulator, the user inputs data to a neural network configured using a true value of a weight and calculates an output from the neural network (an output when quantization is not performed).

(Procedure 4 in the second example) Using the real number simulator, the user inputs data to a function indicating an output using the parameters $\alpha$ and using the true value of the weight and calculates the output (an output when quantization has been performed). The output is, for example, an output (an output value $z_k$ of the number r of identification classes) of an equation obtained by introducing the parameters $\alpha$ and $\beta$ into Equation (6).

(Procedure 5 in the second example) Using the real number simulator, the user determines the quantization step size in which a value regarding an error between a value of an output obtained in (Procedure 3 in the second example) and a value of an output obtained in (Procedure 4 in the second example) is decreased (preferably, minimized). As the value regarding the error, for example, a sum of the errors or a sum of squares of the errors may be used for an output of a final step. Further, for example, a scheme for selecting one value from among a plurality of value candidates and determining the value may be used as a scheme for determining the value of the quantization step size.

Here, as another example, $\Delta z_k$ shown in Equation (11) may be used as the value regarding the error.

Further, as another example, in the (Procedure 5 in the second example), the user may determine the quantization step size in which the identification precision when quantization has been performed is increased (preferably, maximized) using the real number simulator.

As a condition that the value regarding the error is decreased, for example, a condition that the value regarding the error is equal to or less than a predetermined threshold value (or less than the predetermined threshold value) may be used.

Further, for example, a condition that the identification precision is equal to or more than a predetermined threshold value (or exceeds the predetermined threshold value) may be used as a condition that the identification precision is increased.

Condition Using Error and Condition Using Identification Precision

An example of a result of a simulation in which a condition using an error has been set and an example of a result of a simulation in which a condition using the identification precision has been set are shown.

A simulation for searching for a dynamic range in which the sum of the squares of the error is minimized was performed as a simulation in which the condition using the error has been set. As a result, an optimal dynamic range in the first layer was 0.42, an optimal dynamic range in the second layer was 0.96, and the identification precision was 95.64 [%].

On the other hand, a simulation for searching for a dynamic range in which the identification precision is maximized was performed, as the simulation in which the condition using the identification precision was set. As a result, the optimal dynamic range in the first layer was 0.42, the optimal dynamic range in the second layer was 0.96, and the identification precision was 95.64 [%].

Here, the two have matched. Therefore, it is estimated that good identification precision is realized by adopting the dynamic range that satisfies the condition using the error.

Specific Example of Assignment of Dynamic Range to Neuromorphic Element

Figure 6:
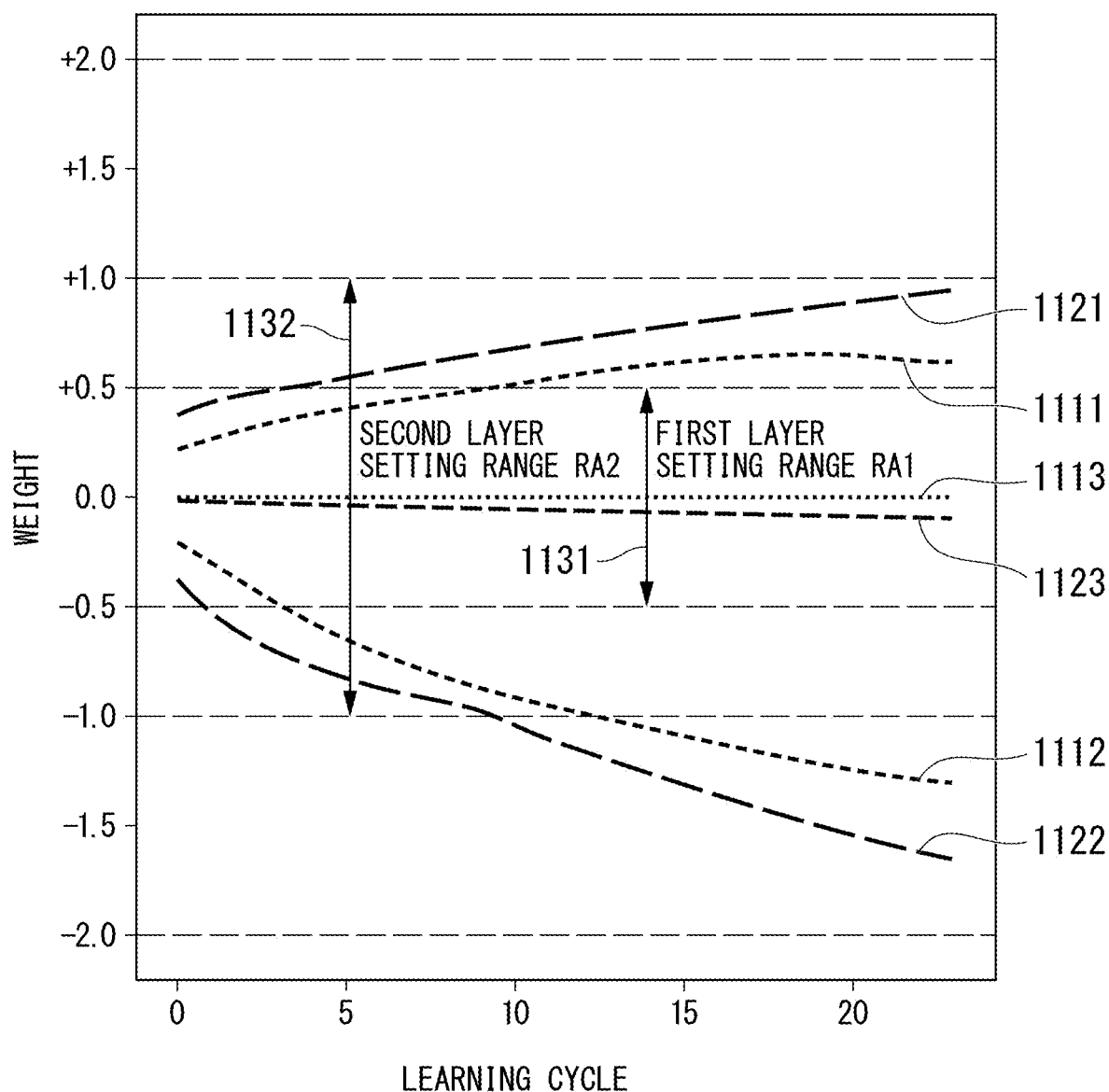
FIG. 6 is a diagram illustrating an example of a result of weight learning according to the embodiment of the present invention.

FIG. 6 is a diagram illustrating an example of a result of weight learning according to the embodiment of the present invention.

In a graph illustrated in FIG. 6, a horizontal axis indicates a learning cycle (the number of epochs in the embodiment), and a vertical axis indicates the value of the weight.

The epoch indicates a unit of a process of minimizing an error of the neural network for one identification target (for example, one image) for training.

In the example of FIG. 6, a characteristic 1111 of the maximum value of the weight in the first layer, a characteristic 1112 of the minimum value of the weight in the first layer, a characteristic 1121 of the maximum value of the weight in the second layer, and a characteristic 1122 of the minimum value of the weight in the second layer are shown as characteristics of the true value acquired by the simulation using the real number.

Further, in the example of FIG. 6, the dynamic range to be set for the neuromorphic element in the first layer is set to a "range from −0.5 to +0.5", and the dynamic range to be set for the neuromorphic element in the second layer is set to a "range from −1.0 to +1.0".

In the example of FIG. 6, a range 1131 (a first layer setting range RA1) corresponding to the dynamic range to be set for the neuromorphic element in the first layer, and a range 1132 (a second layer setting range RA2) corresponding to the dynamic range to be set for the neuromorphic element in the second layer are shown.

Figure 7:
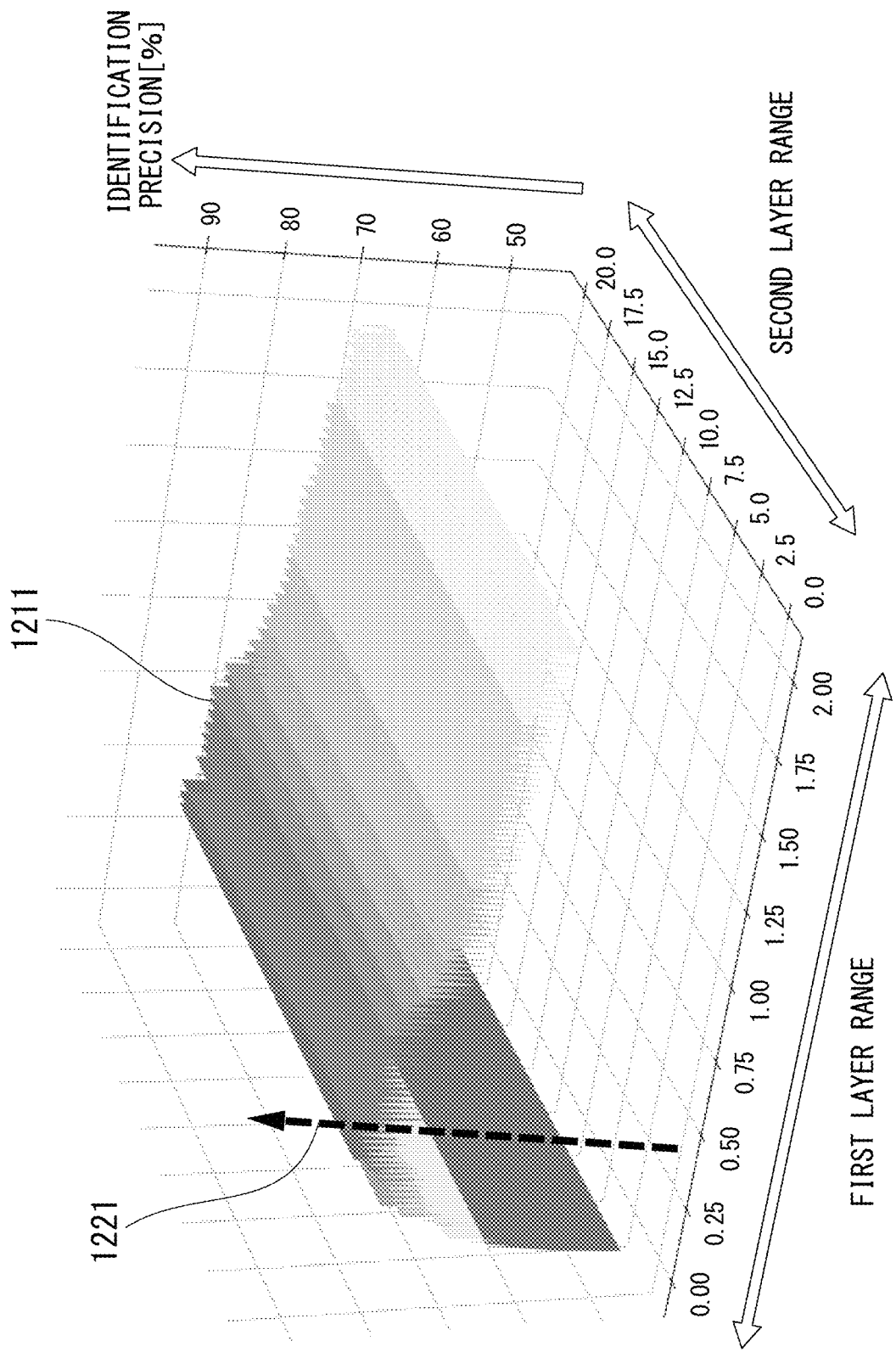
FIG. 7 is a diagram illustrating an example of identification precision according to a dynamic range set in the neuromorphic element according to the embodiment of the present invention.

FIG. 7 is a diagram illustrating an example of the identification precision according to the dynamic range set in the neuromorphic element according to the embodiment of the present invention.

In a graph illustrated in FIG. 7, one of two types of horizontal axes indicates the dynamic range (a range of the first layer) to be set for the neuromorphic element in the first layer, and the other axis indicates the dynamic range (a range of the second layer) to be set for the neuromorphic element in the second layer. Further, a vertical axis indicates identification precision [%] obtained by setting such a dynamic range.

In the example of FIG. 7, a characteristic 1211 indicating a relationship between the three axes is shown, and an arrow 1221 (the arrow 1221 is not parallel to the vertical axis in the example of FIG. 7) is indicated at a position at which the identification precision is maximized.

In the example of FIG. 7, the dynamic range of the first layer is a "range from −0.42 to +0.42", the dynamic range of the second layer is a "range from −0.96 to +0.96", and the identification precision is "95.64 [%] at the position at which the identification precision is maximized".

Next, a case in which the performance of the neural network circuit is improved when the dynamic range is different for each of the plurality of layers will be described with reference to FIGS. 8 to 11.

First, FIGS. 8 and 9 will be described.

Figure 8:
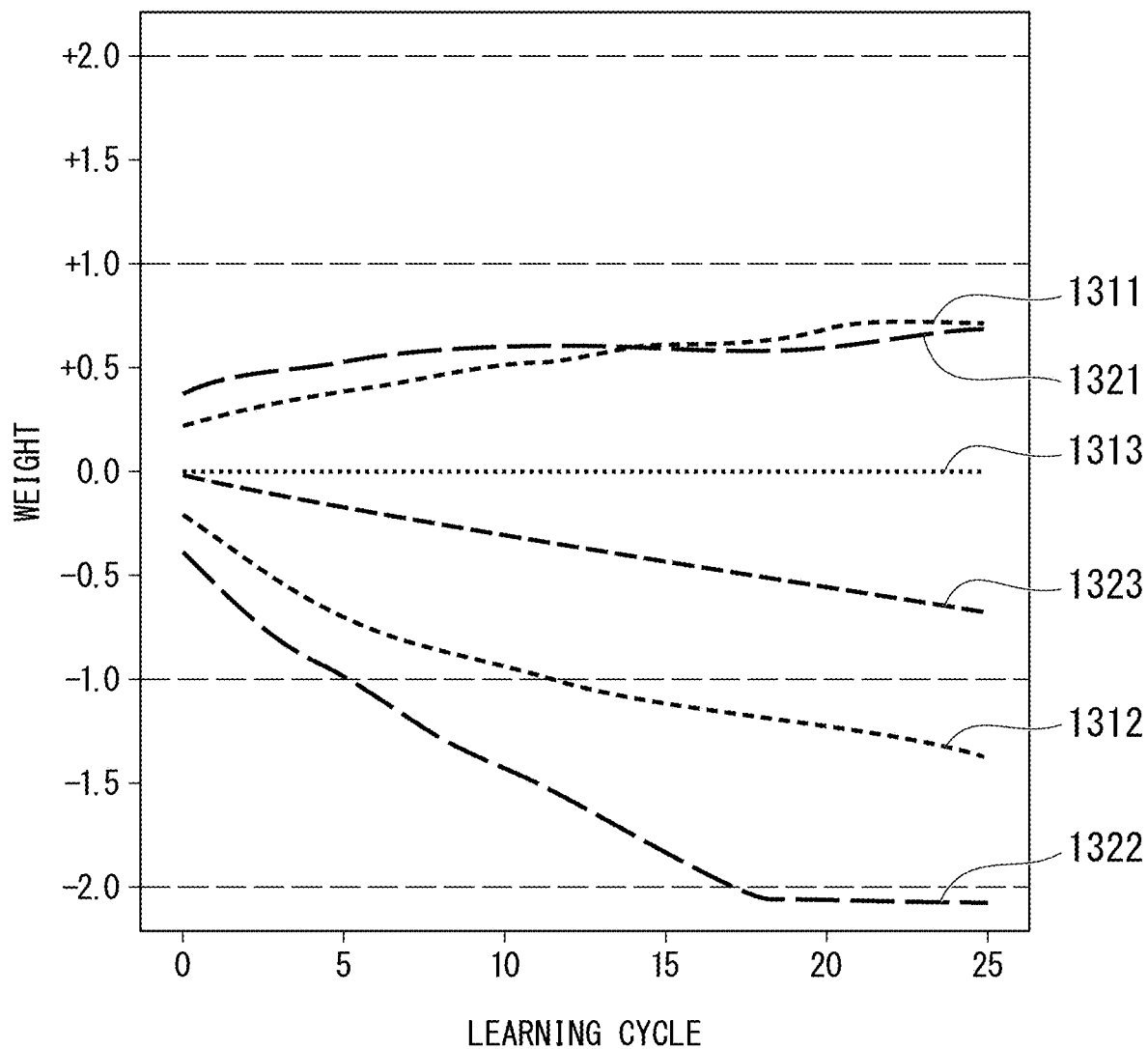
FIG. 8 is a diagram illustrating an example of a result when the same dynamic range is set for all layers in a neuromorphic element.
Figure 9:
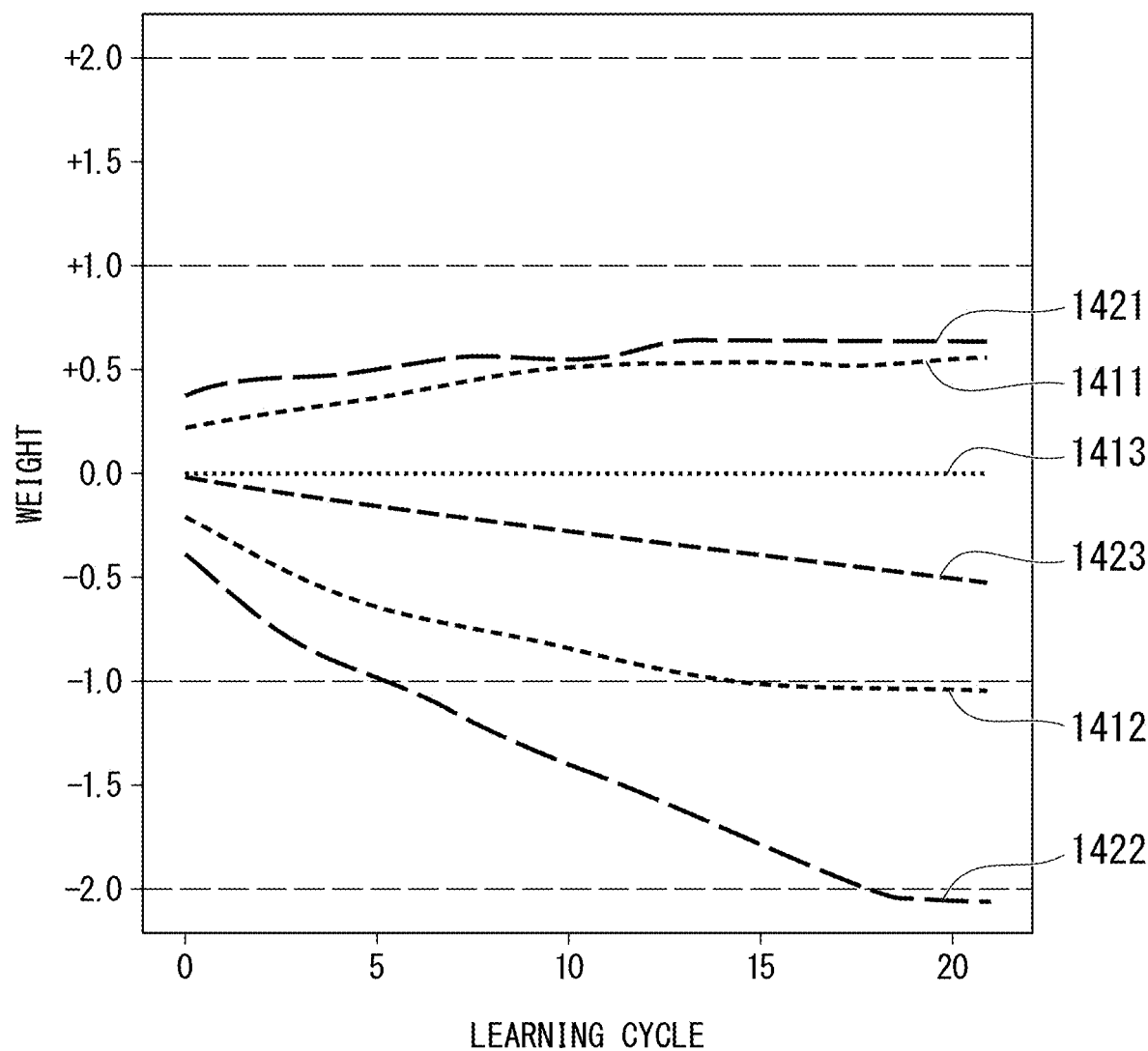
FIG. 9 is a diagram illustrating an example of a result when different dynamic ranges are set for each layer in the neuromorphic element according to the embodiment of the present invention.

In the examples of FIGS. 8 and 9, a case in which the resolution of the characteristics of the neuromorphic element is 100 steps is assumed.

FIG. 8 is a diagram illustrating an example of a result when the same dynamic range is set for the neuromorphic elements for all the layers (the first and second layers in the embodiment).

FIG. 9 is a diagram illustrating an example of a result when different dynamic ranges are set for the neuromorphic elements for each of layers (the first layer and the second layer in the embodiment) according to the embodiment of the present invention.

In graphs illustrated in FIGS. 8 and 9, a horizontal axis indicates a learning cycle (the number of epochs in the embodiment), and a vertical axis indicates the value of the weight.

In the example of FIG. 8, the dynamic ranges to be set for the neuromorphic elements in the first layer and the second layer is set to a "range from −2.0 to +2.0".

In the example of FIG. 8, for learning of the neural network circuit including the neuromorphic elements, a characteristic 1311 of the maximum value of the weight in the first layer, a characteristic 1312 of the minimum value of the weight in the first layer, a characteristic 1313 of the average value of the weight in the first layer, a characteristic 1321 of the maximum value of the weight in the second layer, a characteristic 1322 of the minimum value of the weight in the second layer, and a characteristic 1323 of the average value of the weight in the second layer are shown.

In the example of FIG. 8, the identification precision is "92.6 [%]".

In the example of FIG. 9, the dynamic range to be set for the neuromorphic element in the first layer is set to a "range from −1.0 to +1.0", and the dynamic range to be set for the neuromorphic element in the second layer is set to a "range from −2.0 to +2.0".

In the example of FIG. 9, for learning of the neural network circuit including the neuromorphic elements, a characteristic 1411 of the maximum value of the weight in the first layer, a characteristic 1412 of the minimum value of the weight in the first layer, a characteristic 1413 of the average value of the weight in the first layer, a characteristic 1421 of the maximum value of the weight in the second layer, a characteristic 1422 of the minimum value of the weight in the second layer, and a characteristic 1423 of the average value of the weight in the second layer are shown.

In the example of FIG. 9, the identification precision is "96.6 [%]".

Next, FIGS. 10 and 11 will be described.

Figure 10:
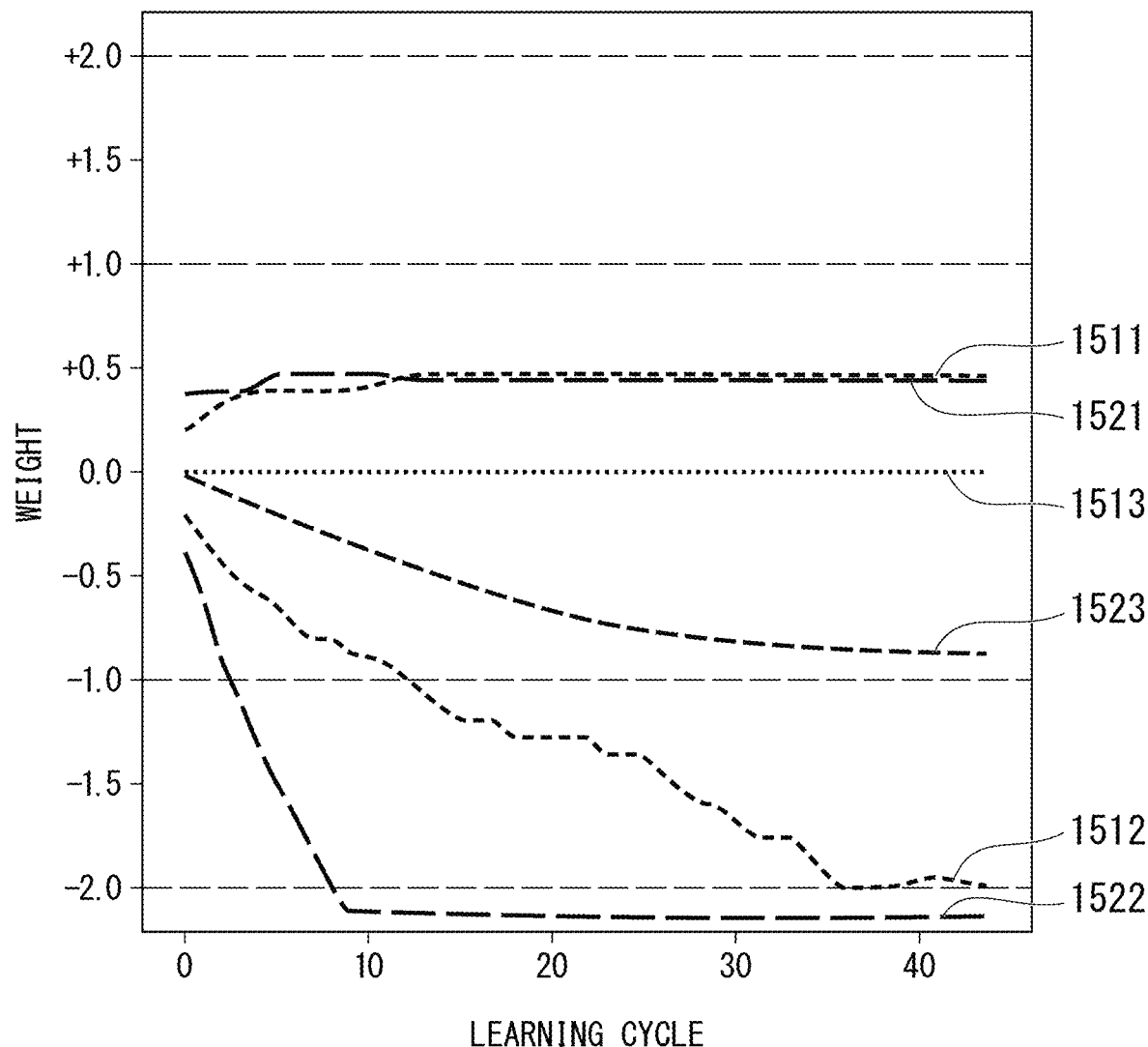
FIG. 10 is a diagram illustrating another example of the result when the same dynamic range is set for all layers in the neuromorphic element.
Figure 11:
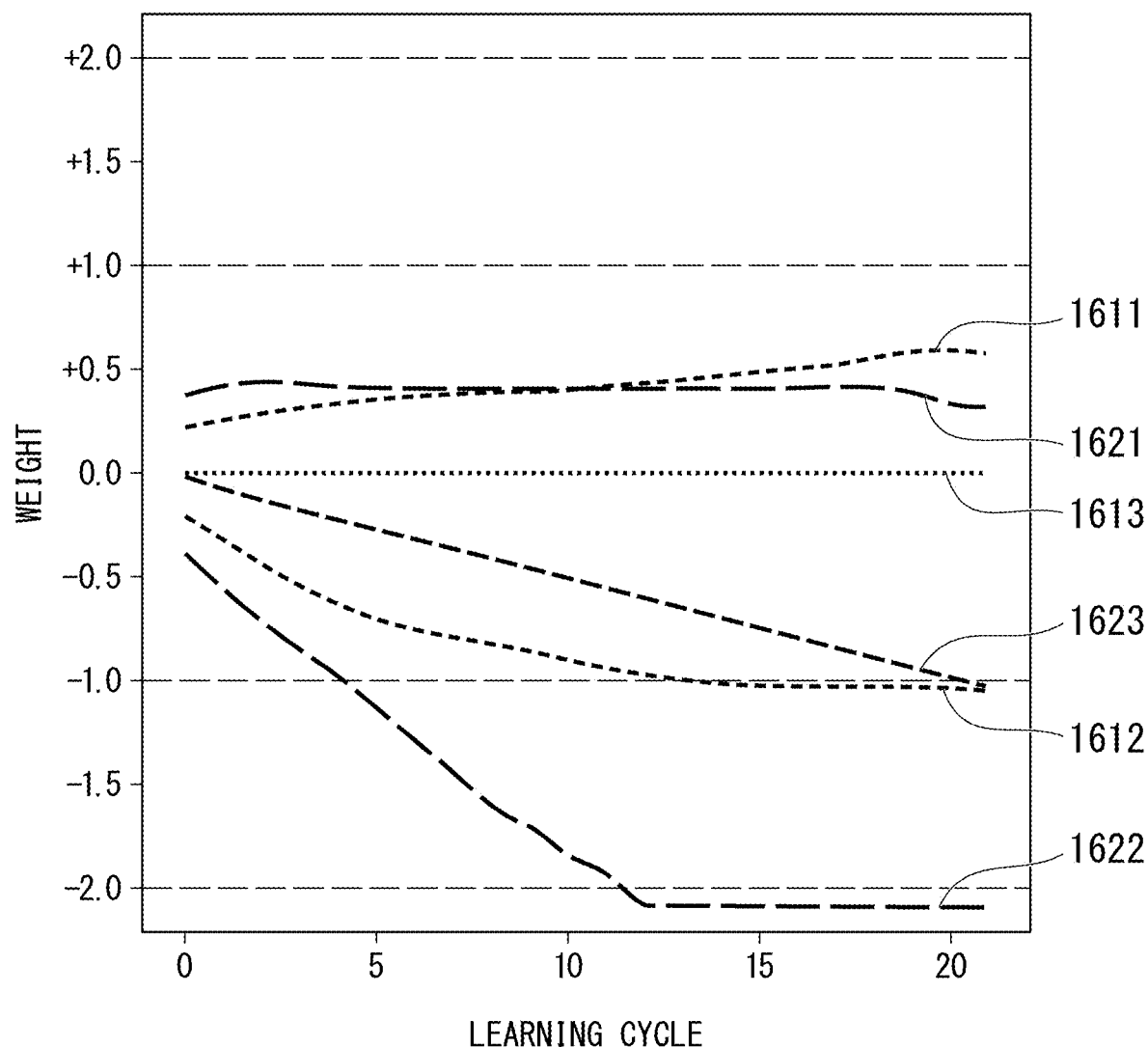
FIG. 11 is a diagram illustrating another example of a result when different dynamic ranges are set for each layer in the neuromorphic elements according to the embodiment of the present invention.

In the examples of FIGS. 10 and 11, a case in which the resolution of the characteristics of the neuromorphic element is 50 steps is assumed.

FIG. 10 is a diagram illustrating another example of the result when the same dynamic range is set for the neuromorphic elements for all the layers (the first and second layers in the embodiment).

FIG. 11 is a diagram illustrating another example of the result when different dynamic ranges are set for the neuromorphic elements for each of layers (the first layer and the second layer in the embodiment) according to the embodiment of the present invention.

In graphs illustrated in FIGS. 10 and 11, a horizontal axis indicates a learning cycle (the number of epochs in the embodiment), and a vertical axis indicates the value of the weight.

In the example of FIG. 10, the dynamic ranges to be set for the neuromorphic elements in the first layer and the second layer are set to a "range from −2.0 to +2.0".

In the example of FIG. 10, for learning of the neural network circuit including the neuromorphic elements, a characteristic 1511 of the maximum value of the weight in the first layer, a characteristic 1512 of the minimum value of the weight in the first layer, a characteristic 1513 of the average value of the weight in the first layer, a characteristic 1521 of the maximum value of the weight in the second layer, a characteristic 1522 of the minimum value of the weight in the second layer, and a characteristic 1523 of the average value of the weight in the second layer are shown.

In the example of FIG. 10, the identification precision is "65.3 [%]".

In the example of FIG. 11, the dynamic range to be set for the neuromorphic element in the first layer is set to a "range from −1.0 to +1.0", and the dynamic range to be set for the neuromorphic element in the second layer is set to a "range from −2.0 to +2.0".

In the example of FIG. 11, for learning of the neural network circuit including the neuromorphic elements, a characteristic 1611 of the maximum value of the weight in the first layer, a characteristic 1612 of the minimum value of the weight in the first layer, a characteristic 1613 of the average value of the weight in the first layer, a characteristic 1621 of the maximum value of the weight in the second layer, a characteristic 1622 of the minimum value of the weight in the second layer, and a characteristic 1623 of the average value of the weight in the second layer are shown.

In the example of FIG. 11, the identification precision is "90.8 [%]".

Here, FIGS. 8 to 11 illustrate results of a simulation, but one additional weight update unnecessarily occurs due to conditions of the simulation. Therefore, in the examples of FIGS. 8 to 11, characteristics protrude outside the set dynamic range (in the example, a "range from −2.0 to +2.0" or a "range from −1.0 to +1.0"), but this is merely due to circumstances of the simulation and does not suggest an accurate value. Thus, in the results of the simulation, although some of the values may not be accurate values, the tendency of the characteristics is shown as a whole.

Here, as shown in the examples of FIGS. 8 to 11, the identification performance may be better in a case in which different dynamic ranges are set for the neuromorphic elements for each of the layers (the first and second layers in the embodiment) than in a case in which the same dynamic range is set for the neuromorphic elements for all the layers (the first and second layers in the embodiment).

Offset Amount of Dynamic Range

In the above description, a case in which the dynamic range to be set for the neuromorphic element is assumed to be a "range from −B to +B" (B is any positive value), and a median of the dynamic range is 0 is shown. The offset amount of the dynamic range in this case is set to 0.

On the other hand, the offset amount may be set for the dynamic range to be set for the neuromorphic element. In this case, the median of the dynamic range is shifted from 0 by an offset amount.

In the embodiment, it is assumed that the width of the dynamic range is constant regardless of a magnitude of the offset amount.

For example, when the offset amount is 0, the dynamic range is a "range from −B to +B", and the offset amount is C which is not 0 (C is a positive value or a negative value), the dynamic range is a "range from (−B+C) to (+B+C)".

The identification precision may be higher when the offset amount of the dynamic range is not 0 than when the offset amount of the dynamic range is 0.

Figure 12:
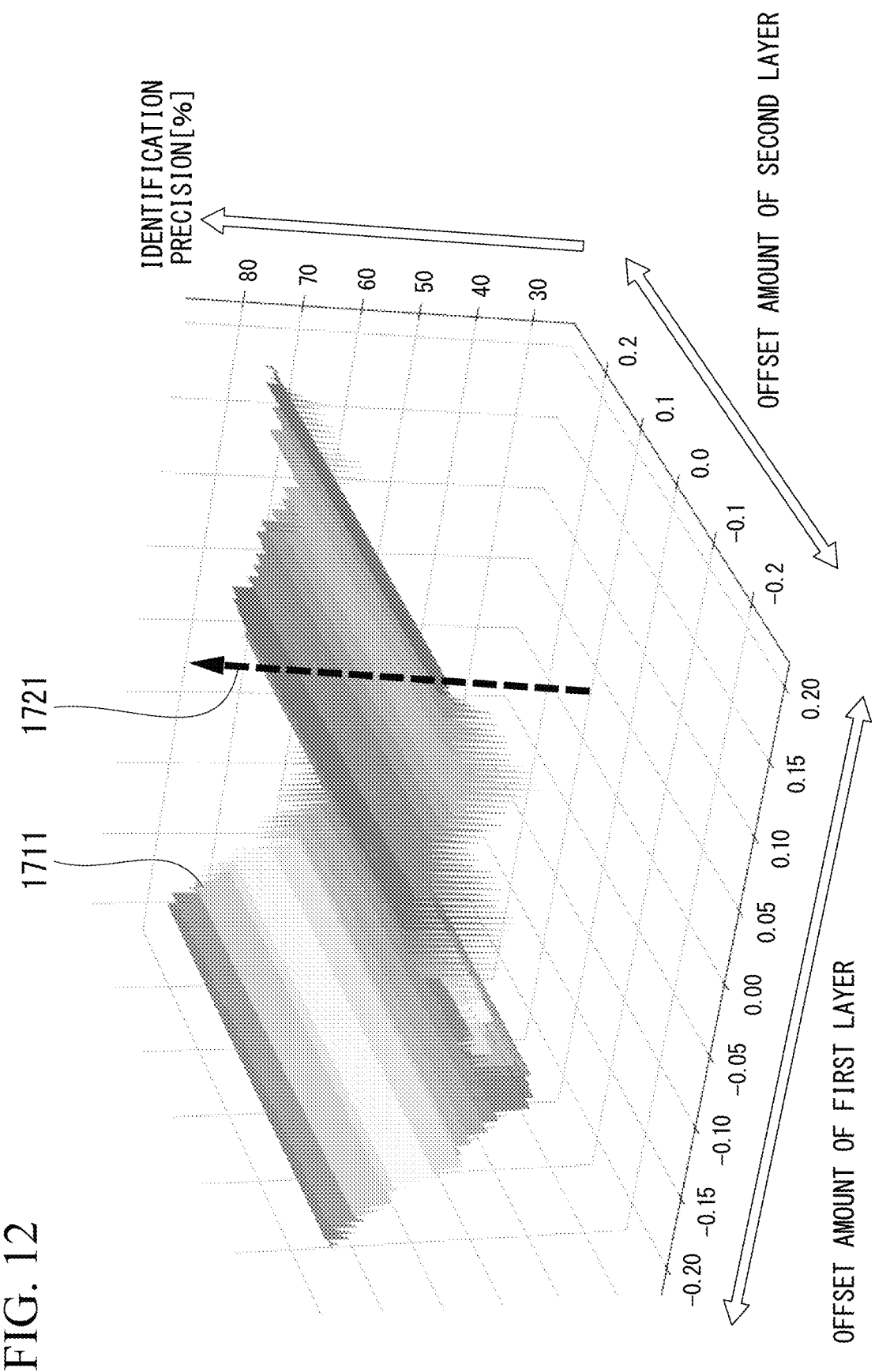
FIG. 12 is a diagram illustrating an example of identification precision according to an offset amount of a dynamic range set in the neuromorphic element according to the embodiment of the present invention.

FIG. 12 is a diagram illustrating an example of the identification precision according to the offset amount of the dynamic range set in the neuromorphic element according to the embodiment of the present invention.

In a graph illustrated in FIG. 12, one of two types of horizontal axes indicates the offset amount of the dynamic range (the offset amount of the first layer) set in the neuromorphic element in the first layer, and the other axis indicates the offset amount (the offset amount of the second layer) of the dynamic range set for the neuromorphic element in the second layer. Further, a vertical axis indicates the identification precision [%] obtained by setting such an offset amount.

In the example of FIG. 12, a characteristic 1711 indicating a relationship between the three axes is shown, and an arrow 1721 (the arrow 1721 is not parallel to the vertical axis in the example of FIG. 12) is shown at the position at which the identification precision is maximized.

In the example of FIG. 12, the offset amount of the first layer is "0.0038", the offset amount of the second layer is "0.1196", and the identification precision is "87.98 [%]" at the position at which the identification precision is maximized".

Here, in the embodiment, the computer calculates the offset amount of the dynamic range set in the neuromorphic element. A function of calculating such an offset amount may be, for example, a function that is realized by the real number simulator. Such a computer may be, for example, a computer included in the neural network circuit 101 (for example, the weight calculation control circuit 112), or may be another computer.

In the embodiment, using a computer, a value matching the average value of the value (true value) of the weight is set as the offset amount on the basis of a result of calculating a value (true value) of a weight in a neural network that is realized by the element array 121 with a higher precision than the resolution of the characteristics of the neuromorphic element included in the element array 121.

As another example, a scheme for calculating, using a computer, a value indicating a predetermined error by variously changing an offset amount of a dynamic range in each layer, and obtaining an offset amount in which the value indicating the error is decreased (preferably, minimized) may be used. An offset amount in which the identification precision is increased (preferably, maximized) may be obtained instead of the offset amount in which the value indicating the error is decreased (preferably, minimized).

Post-Learning

In the neural network circuit 101, tuning of the weight may be performed by performing post-learning after the dynamic range is assigned to the neuromorphic element included in the element array 121.

Here, any scheme may be used as a scheme of performing tuning.

Storage of Information

In the neural network circuit 101, information such as the assigned dynamic range (the dynamic range width and the offset amount), the quantization step size, the resolution, and a step number set for each neuromorphic element may be stored for the neuromorphic element included in the element array 121 in a storage unit (such as a memory corresponding to the storage unit 24).

Setting of Dynamic Range for Plurality of Neuromorphic Elements

In the element array 121, for example, there are a plurality of layers, and a plurality (a plurality of units) of neuromorphic elements are included in each layer.

As an example, for a neuromorphic element included in a neural network including a plurality of layers, a common dynamic range (for example, a dynamic range width and an offset amount) may be obtained and set using a common discretization step size for each layer.

As another example, a plurality of neuromorphic elements included in each layer are divided into two or more groups, and a common dynamic range (for example, a dynamic range width and an offset amount) may be obtained and set using a common discretization step size for each group. In this case, in the same layer, a plurality of neuromorphic elements included in the layer are divided into two or more groups. Thereby, for example, different dynamic ranges can be set according to a degree of importance (a degree of contribution) of each unit.

As another example, any dynamic ranges (for example, a dynamic range width and an offset amount) that can be different may be obtained and set using any discretization step size that can be different for each neuromorphic element. Thereby, for example, different dynamic ranges can be set according to the degree of importance (the degree of contribution) of the respective neuromorphic elements.

Example of Procedure of Process Performed in Neural Network Circuit

Figure 13:
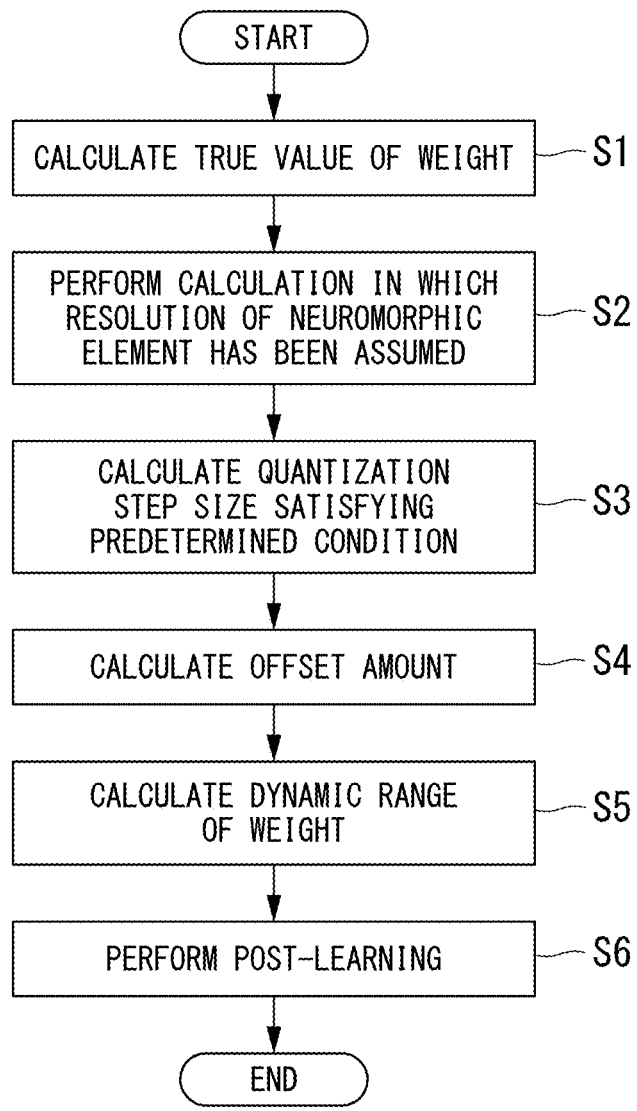
FIG. 13 is a diagram illustrating an example of a procedure of a process that is performed in the neural network circuit according to the embodiment of the present invention.

FIG. 13 is a diagram illustrating an example of a procedure of a process that is performed in the neural network circuit 101 according to the embodiment of the present invention.

(Step S1)

Using the computer, the value (true value) of the weight in the neural network that is realized by the element array 121 is calculated with a higher precision than the resolution of the characteristics of the neuromorphic element included in the element array 121.

(Step S2)

A calculation in which the resolution of the characteristics of the neuromorphic element included in the element array 121 has been assumed is performed using the computer. Thereby, for example, the function regarding the error or the function regarding the identification precision is calculated using the computer when the resolution of characteristics of the neuromorphic element included in the element array 121 has been assumed.

(Step S3)

Using a computer, a quantization step size satisfying a predetermined condition is calculated for the neuromorphic element included in the element array 121. As the predetermined condition, for example, one or both of a condition regarding an error and a condition regarding identification precision may be used.

(Step S4)

Using the computer, the offset amount of the dynamic range is calculated for the neuromorphic element included in the element array 121.

Here, when the offset amount is set to a predetermined value (for example, 0) in advance, the process of step S4 may be omitted.

(Step S5)

the dynamic range of the weight is calculated by computer. In this case, for example, the dynamic range is calculated on the basis of the resolution, the quantization step size, and the offset amount.

(Step S6)

The calculated dynamic range is set in the neural network circuit 101. A predetermined post-learning is performed on the neural network that is realized by the element array 121 by the neural network circuit 101. When the post-learning is unnecessary, the process of step S6 may be omitted.

Here, when a calculation result of the dynamic range is obtained by a computer separate from the neural network circuit 101, the calculated dynamic range is set in the neural network circuit 101 by the user or the computer. In this case, for example, off-chip learning may be performed. That is, a calculation such as learning may be executed by a high-precision calculator (computer) for a real number or the like provided separately from the neural network circuit 101, and a result of the calculation may be set in the neural network circuit 101.

Conclusion of First Embodiment

As described above, in a configuration in which the weight (connection weight) is realized by a neuromorphic element having a finite resolution in the neural network system 1 according to the embodiment, an appropriate discretization step size is determined on the basis of a case in which the true value of the connection weight obtained by the real number simulator or the like with precision higher than the resolution is used and a case in which the discretization step size set for the characteristics of the neuromorphic element is used. Further, the dynamic range (the width of the dynamic range) is determined on the basis of the determined discretization step size and the resolution. Further, the dynamic range (the width and the offset amount of the dynamic range, the upper limit value, and the lower limit value) is determined on the basis of the offset amount (0 or a value other than 0) of the dynamic range.

In the neural network system 1 according to the embodiment, the value of the characteristics (the conductance in the embodiment) of the neuromorphic element is controlled on the basis of the determined dynamic range (the upper limit and the lower limit). In the neuromorphic element, a signal is given a weight according to the value of the controlled characteristic in a range of the characteristics of the neuromorphic element (a range between the upper limit and the lower limit of the conductance in the embodiment). Thereby, in the element array unit 12 (the element array 121), a process of the neural network configured by the element array unit 12 (for example, a process of identifying an input identification target) is realized.

In the neural network system 1 according to the embodiment, when a neuromorphic element is used for the product-sum calculation in the neural network, it is possible to improve the precision of the result.

For example, when the neural network is realized using neuromorphic elements, it is assumed that the connection weight obtained by learning is normalized and assigned to an output range (a dynamic range) of the neuromorphic element. In this case, since the change in the characteristics of the neuromorphic element is in a step shape, a quantization error occurs.

Further, for example, in an error backpropagation method to be used for updating of the weight in the neural network, a weight updating amount depends on an absolute value of input data or teacher data, and a dynamic range that the weight can take is different for each layer. Further, the weight updating amount depends on an algorithm to be used for updating of the weight.

Therefore, in the neural network system 1 according to the embodiment, the value of the weight assigned to the neuromorphic element is appropriately set in consideration of an influence of the quantization error on identification performance of the neural network. Thereby, in the neural network system 1 according to the embodiment, it is possible to curb a decrease in the identification performance in the neural network using the neuromorphic element.

Here, even when a dynamic range narrower than a dynamic range obtained by a calculation result of, for example, a simulation using a real number is set in the neuromorphic element, the identification precision in the neural network using the neuromorphic element can be improved.

Further, in the neural network system 1 according to the embodiment, a smaller (narrower) dynamic range is set for a layer close to an input (the first layer from the input layer LA1 to the output of the hidden layer LA2 in the embodiment) in a multilayer neural network, as compared with a subsequent layer (the second layer from the output of the hidden layer LA2 to the output of the output layer LA3 in the embodiment). In the embodiment, since it is conceivable that the precision on the side of the input layer LA1 having a large number of units is more significant than that on the subsequent layer side, the quantization step size is set to be smaller on the input layer LA1 side (that is, with high calculation precision).

Here, although numeral image data is used as a target (identification target) to be identified by the neural network in the embodiment, any data may be used as the identification target.

Further, any type of neural network may be used as the neural network. For example, a fully connected neural network, a convolutional neural network, a recursive neural network, or the like may be used.

Further, although a case in which the dynamic range of the neuromorphic element to be used in the product-sum calculation for realizing the neural network is set has been described in the embodiment, the same configuration as in the embodiment may also be applied to fields other than the neural network.

For example, the same configuration as in the embodiment may be applied to an array that performs a product-sum calculation (a product-sum calculation array) in any field, an analog calculation unit including a product-sum calculation in any field, or the like.

Further, various resolutions may be used as the resolution of the neuromorphic element included in the array. For example, when the array has a plurality of layers including neuromorphic elements, a neuromorphic element having a common resolution (the same resolution) to the respective layers may be included. Further, in such a case, a configuration in which the resolutions of the neuromorphic elements in different layers are different may be used. That is, a configuration in which the resolutions of a plurality of neuromorphic elements included in the same layer may be the same may be used, a configuration in which the resolution is different when the layer including the neuromorphic element is different may be used, or both of the configurations may be used.

Second Embodiment

Hereinafter, a second embodiment of the present invention will be described with reference to FIGS. 14 to 27.

Overview of Neural Network Device

Figures 14, 15:
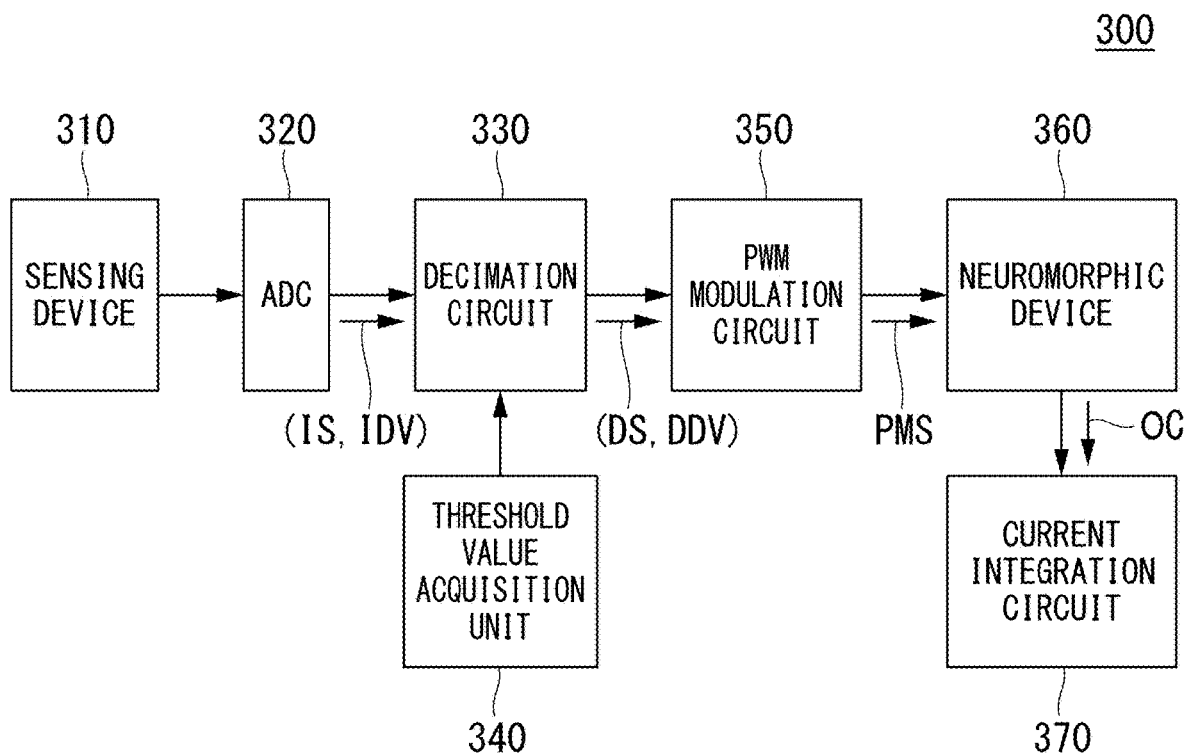
FIG. 14 is a diagram illustrating a schematic configuration of a neural network device according to a second embodiment of the present invention.
FIG. 15 is a diagram illustrating an example of a threshold value that is referred to by a decimation circuit of the present embodiment.

FIG. 14 is a diagram illustrating a schematic configuration of a neural network device 300 according to the second embodiment of the present invention.

The neural network device 300 includes a sensing device 310, an AD converter 320, a decimation circuit 330, a threshold value acquisition unit 340, a PWM modulation circuit 350, a neuromorphic device 360, and a current integration circuit 370.

The sensing device 310 can be configured of various sensors. As an example, the sensing device 310 includes an imaging element such as a charge-coupled device (CCD) image sensor or a complementary MOS (CMOS) image sensor, and outputs an image signal according to an amount of incident light. In this example, the sensing device 310 samples an image at a predetermined number of pixels or in a frame period, and outputs a pixel value of the sampled image as an analog signal.

The AD converter 320 converts the analog signal output by the sensing device 310 to a digital signal according to a predetermined quantization step number (quantization bit number). The quantization step number of a digital signal is also referred to as a resolution of the digital signal.

In this example, the AD converter 320 performs conversion according to an 8-bit quantization step number (that is, 256 steps from 0 to 255). In this case, a quantization step number of the digital signal output by the AD converter 320 is 256. The AD converter 320 outputs the digital signal after the conversion to the decimation circuit 330.

In this example, a case in which the neural network device 300 includes the sensing device 310 and the AD converter 320 will be described, but the present invention is not limited thereto. The neural network device 300 may be configured not to include the sensing device 310 and the AD converter 320. In this case, the neural network device 300 acquires the digital signal output by the AD converter 320.

The decimation circuit 330 acquires the digital signal output by the AD converter 320 as an input signal IS. As described above, the input signal IS is 8-bit quantized. That is, in this example, the quantization step number of the input signal IS is 256.

This decimation circuit 330 (decimation unit) performs conversion to a discrete value having a smaller step number than a quantization step number of the input signal IS on the basis of a predetermined threshold value th to generate the decimation signal DS. In the following description, a digital value (discrete value) indicating the magnitude of the input signal IS is also described as an input discrete value IDV. Further, a digital value (discrete value) indicating a magnitude of the decimation signal DS is also referred to as a post-decimation discrete value DDV.

The threshold value acquisition unit 340 acquires the threshold value th that is referred to by the decimation circuit 330 from an external circuit (or an external device).

The threshold value th acquired by the threshold value acquisition unit 340 is determined in advance on the basis of a weighting result of the output current OC (weighted signal) output by the neuromorphic device 360.

The threshold value th acquired by the threshold value acquisition unit 340 and a relationship between the threshold value th and the discrete values before and after the conversion in the decimation circuit 330 will be described with reference to FIGS. 15 and 16.

FIG. 15 is a diagram illustrating an example of the threshold value th that is referred to by the decimation circuit 330 of the embodiment.

Figure 16:
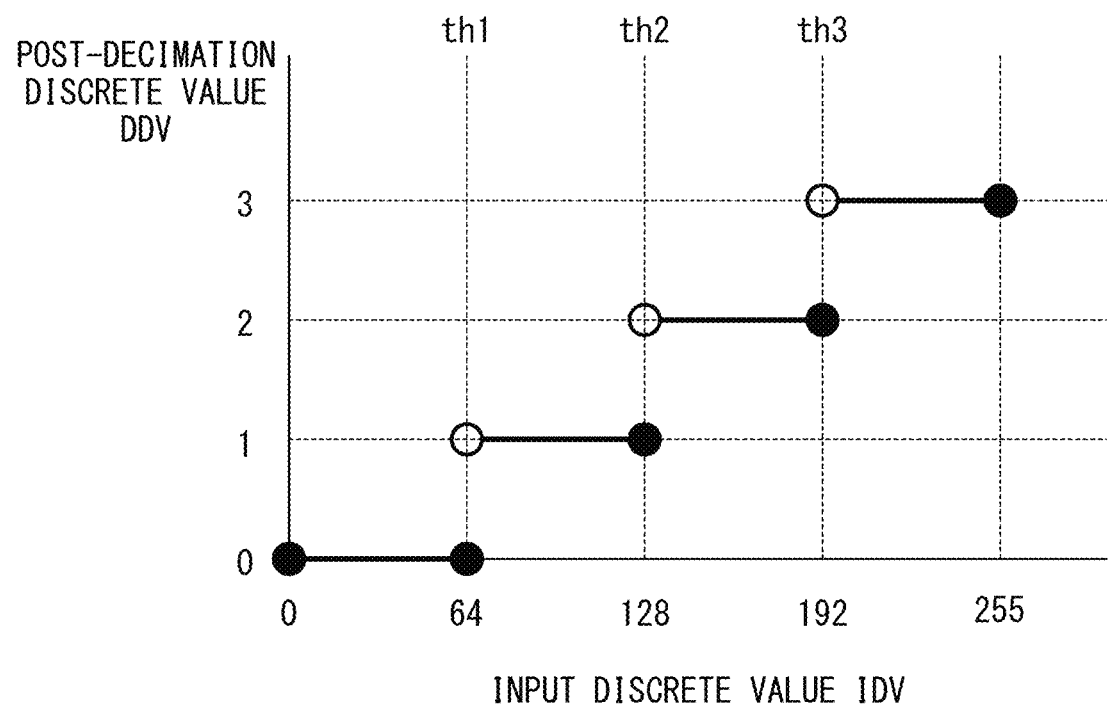
FIG. 16 is a diagram illustrating an example of discrete value conversion in the decimation circuit of the embodiment.

FIG. 16 is a diagram illustrating an example of discrete value conversion in the decimation circuit 330 of the embodiment.

In this example, threshold values th1 to th3 for dividing the quantization step number (256 steps) of the input signal IS into four are set. More specifically, the threshold value th1 is set to a value of 64. In this case, when the input discrete value IDV is equal to or less than the threshold value th1 (that is, is equal to or less than the value of 64), the decimation circuit 330 converts the discrete value, with the discrete value DDV being 0 (zero). Similarly, the decimation circuit 330 converts the input discrete value IDV to the post-decimation discrete value DDV, with the value of the threshold value th2 (for example, a value of 128) and the value of the threshold value th3 (for example, a value of 192) being determination threshold values.

That is, when the input discrete value IDV is 0 to 64, the decimation circuit 330 sets the post-decimation discrete value DDV to 0 (zero). When the input discrete value IDV is 65 to 128, the decimation circuit 330 sets the post-decimation discrete value DDV to 1. When the input discrete value IDV is 129 to 192, the decimation circuit 330 sets the post-decimation discrete value DDV to 2. When the input discrete value IDV is 193 to 255, the decimation circuit 330 sets the post-decimation discrete value DDV to 3.

Referring back to FIG. 14, the decimation circuit 330 outputs a digital signal after the discrete value conversion to the PWM modulation circuit 350 as the decimation signal DS.

The PWM modulation circuit 350 (modulation unit) acquires the decimation signal DS output by the decimation circuit 330.

The PWM modulation circuit 350 performs pulse width modulation on the discrete value of the decimation signal DS generated by the decimation circuit 330 to generate a pulse width modulation signal PMS indicating the discrete value of the decimation signal DS in a pulse width. An example of the pulse width modulation in the PWM modulation circuit 350 will be described with reference to FIG. 17.

Figure 17:
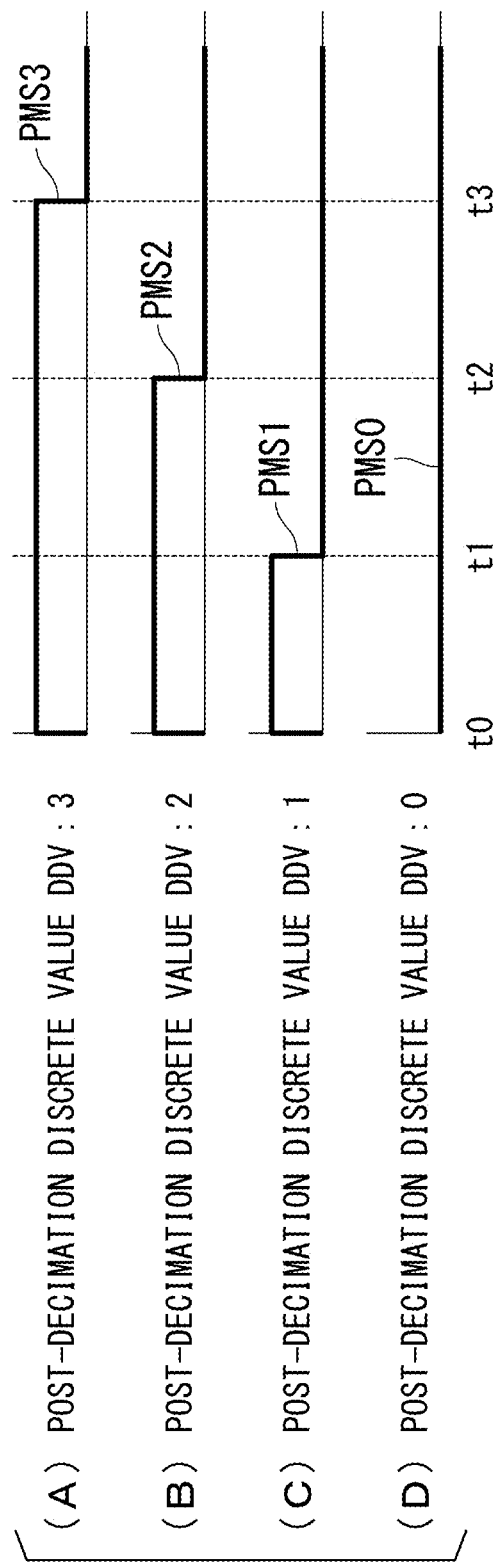
FIG. 17 is a diagram illustrating an example of pulse width modulation in a PWM modulation circuit of the embodiment.

FIG. 17 is a diagram illustrating an example of pulse width modulation in the PWM modulation circuit 350 of the embodiment. The PWM modulation circuit 350 generates the pulse width modulation signal PMS having a pulse width according to a magnitude of the post-decimation discrete value DDV.

Specifically, when the post-decimation discrete value DDV of the decimation signal DS is 3, the PWM modulation circuit 350 generates the pulse width modulation signal PMS having a pulse width of 3 (time t0 to time t3) (FIG. 17A). When the post-decimation discrete value DDV of the decimation signal DS is 2, the PWM modulation circuit 350 generates the pulse width modulation signal PMS having a pulse width of 2 (time t0 to time t2) (FIG. 17B). When the post-decimation discrete value DDV of the decimation signal DS is 1, the PWM modulation circuit 350 generates the pulse width modulation signal PMS having a pulse width of 1 (time t0 to time t1) (FIG. 17C). When the post-decimation discrete value DDV of the decimation signal DS is 0 (zero), the PWM modulation circuit 350 generates the pulse width modulation signal PMS having a pulse width of 0 (zero) (FIG. 17D).

Referring back to FIG. 14, the PWM modulation circuit 350 outputs the generated pulse width modulation signal PMS to the neuromorphic device 360.

The neuromorphic device 360 outputs an output current OC, which is a weighted signal, on the basis of the pulse width modulation signal PMS and a preset weight.

Figure 18:
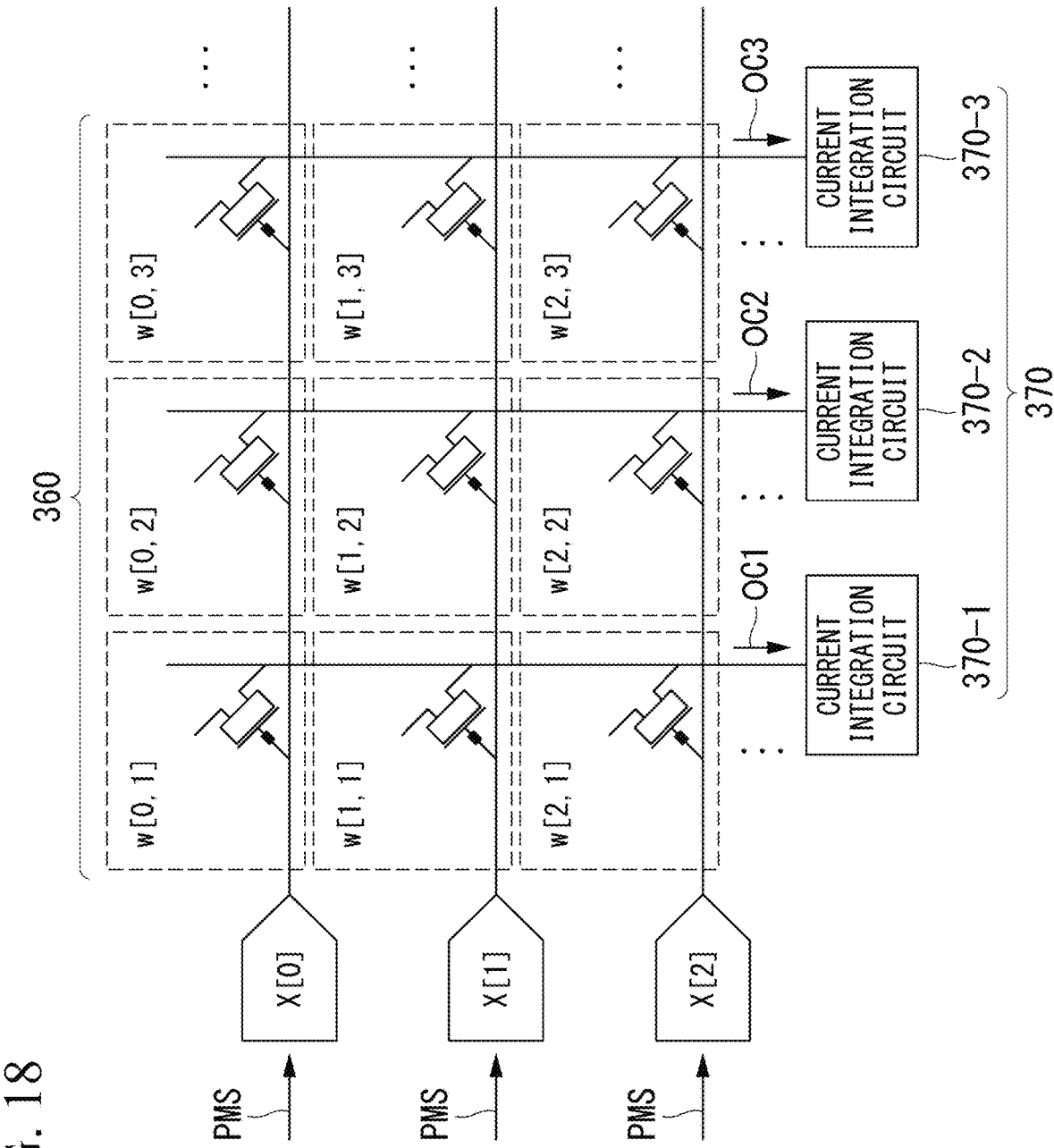
FIG. 18 is a diagram illustrating an example of a configuration of a neuromorphic element of the embodiment.

FIG. 18 is a diagram illustrating an example of a configuration of the neuromorphic device 360 of the embodiment. The neuromorphic device 360 includes a neuromorphic element. The neuromorphic device 360 multiplies the pulse width modulation signal PMS generated by the PWM modulation circuit 350 (modulation unit) by the weight depending on the value of the variable characteristic to output an output current OC (weighted signal) obtained by weighting the pulse width modulation signal PMS.

The current integration circuit 370 integrates (time-integrates) a current magnitude of the output current OC (the weighted signal) output by the neuromorphic device 360 (the weighting unit). The current integration circuit 370 is included in each of output signal lines. FIG. 18 schematically illustrates three of X[0] to X[2] among a plurality of input signals X[0] to X[n] and three of a plurality of output signal lines. In this example, the current integration circuit 370 includes current integration circuits 370-1 to 370-3.

Figure 19:
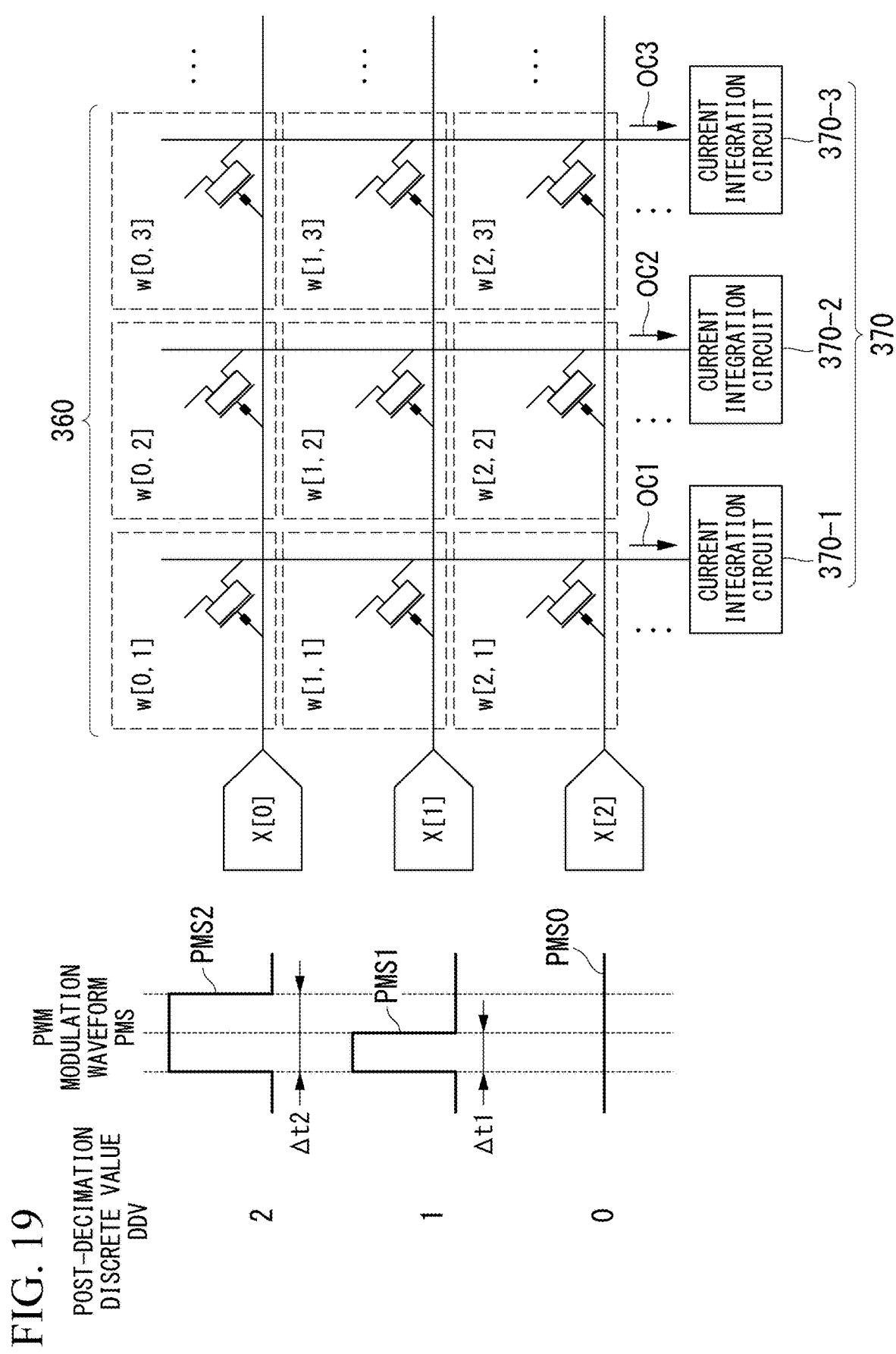
FIG. 19 is a diagram illustrating an example of a pulse width modulation signal that is supplied to the neuromorphic element of the embodiment.

FIG. 19 is a diagram illustrating an example of the pulse width modulation signal PMS that is supplied to the neuromorphic device 360 of the embodiment. In this example, a pulse width modulation signal PMS2 having a pulse width of 2 is supplied as an input signal X[0] to the neuromorphic device 360, a pulse width modulation signal PMS1 having a pulse width of 1 is supplied as an input signal X[1] to the neuromorphic device 360, and a pulse width modulation signal PMS0 having a pulse width of 0 is supplied as an input signal X[2] to the neuromorphic device 360.

The neuromorphic device 360 multiplies the input signal X[0] by a weight w[0, 1], a weight w[0, 2], and a weight w[0, 3] and output the output current OC. Similarly, the neuromorphic device 360 multiplies the input signal X[1] by a weight w[1,1], a weight w[1,2], and a weight w[1,3] and outputs the output current OC. The neuromorphic device 360 multiplies the input signal X[2] by a weight w[2,1], a weight w[2,2], and a weight w[2,3] and outputs the output current OC.

The current integration circuit 370-1 integrates a current magnitude of an output current OC1. The current integration circuit 370-2 integrates a current magnitude of an output current OC2. The current integration circuit 370-3 integrates a current magnitude of an output current OC3.

As described above, the neural network device 300 of the embodiment converts the input discrete value IDV of the input signal IS to a discrete value having a smaller step number than a quantization step number of the input signal IS. Here, a comparison between the neural network device 300 of the embodiment and a neural network device of the related art will be described.

Figure 27:
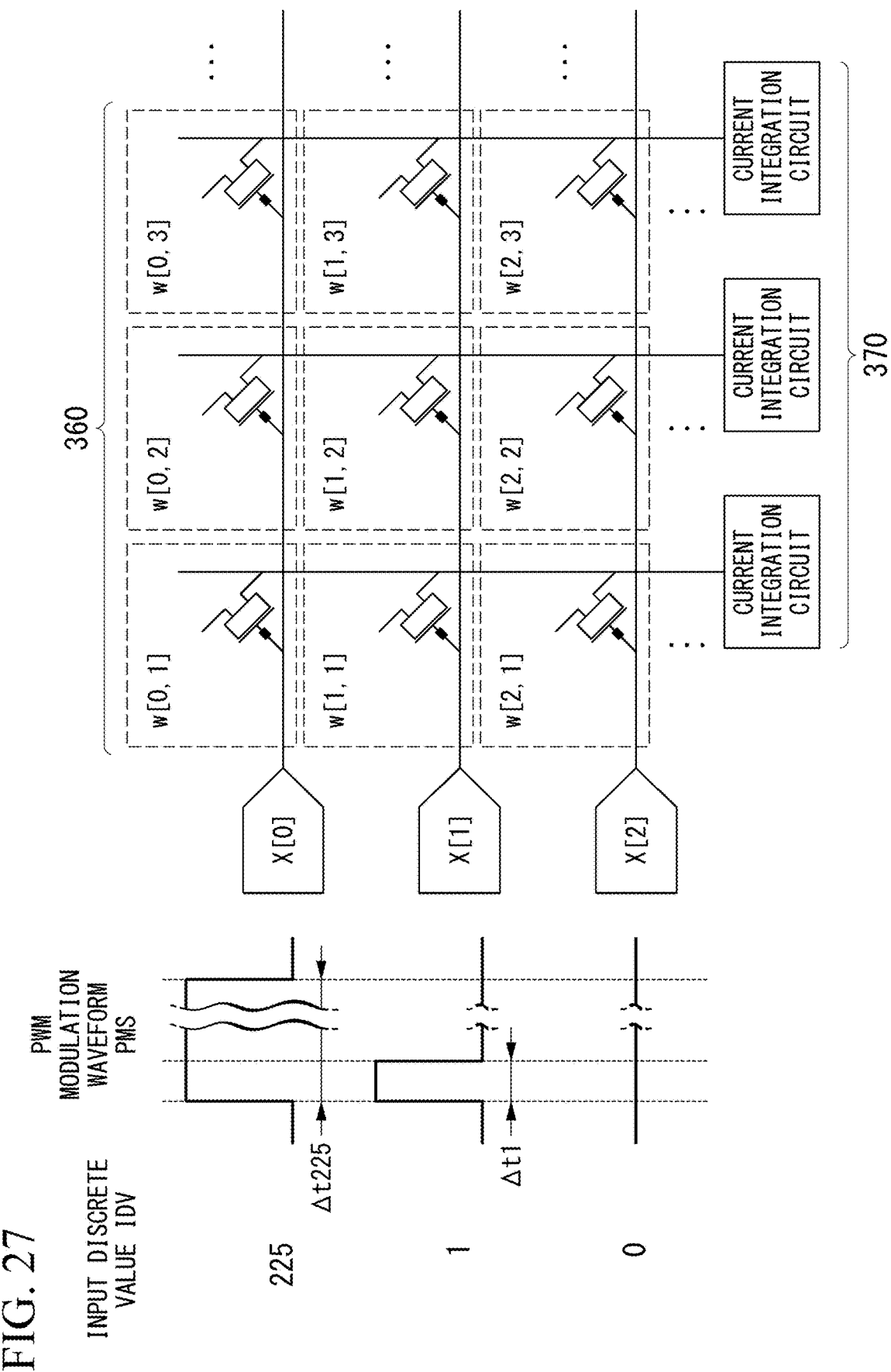
FIG. 27 is a diagram illustrating an example of a configuration of a neural network device of the related art.

FIG. 27 is a diagram illustrating an example of a configuration of the neural network device of the related art. This neural network device of the related art does not include the decimation circuit 330 of the embodiment, and converts the input discrete value IDV of the input signal IS to the pulse width modulation signal PMS as it is. Here, when the quantization step number of the input signal IS is 256, the pulse width of the pulse width modulation signal PMS is 256 steps from 0 to 255. Here, a time required for integration of the output current OC in the current integration circuit 370 (an integration time) depends on the step number of the pulse width of the pulse width modulation signal PMS that is supplied to the neuromorphic device 360. For example, when the pulse width modulation signal PMS having a pulse width of 256 steps is supplied to the neuromorphic device 360 as in the neural network device of the related art, a time according to 256 steps is required for the integration time of the output current OC in the current integration circuit 370.

That is, when the quantization step number of the input discrete value IDV of the input signal IS is larger, there is a problem in that the integration time of the output current OC in the current integration circuit 370 increases, and the calculation time increases (for example, a throughput decreases).

Further, an integration result in the current integration circuit 370 is susceptible to a noise component included in the output current OC due to, for example, power supply voltage fluctuation or disturbance. When the integration time of the output current OC in the current integration circuit 370 becomes long, the integration result is more susceptible to the noise component included in the output current OC.

For example, it is conceivable to increase an S/N ratio of the output current OC by increasing a pulse width (unit pulse width) per discrete value of the pulse width modulation signal PMS in order to decrease an influence of the noise component and increase the precision of the integration result in the current integration circuit 370. However, when a unit pulse width of the pulse width modulation signal PMS is increased, there is a problem in that an integration time in the current integration circuit 370 is further increased.

On the other hand, the neural network device 300 of the embodiment includes the decimation circuit 330. As described above, the decimation circuit 330 decreases the step number of the pulse width of the pulse width modulation signal PMS that is supplied to the neuromorphic device 360. Therefore, according to the neural network device 300 of the embodiment, even when the quantization step number (the number of quantization bits) of the input signal IS is relatively large, the integration time of the output current OC in the current integration circuit 370 can be decreased. Therefore, according to the neural network device 300, the calculation time can be decreased. Further, according to the neural network device 300, since the integration time of the output current OC in the current integration circuit 370 is decreased, the integration result is not susceptible to the noise component included in the output current OC, and it is possible to increase the precision of the integration result in the current integration circuit 370, as compared with the related art described above.

MODIFICATION EXAMPLE (PART 1)

Figure 20:
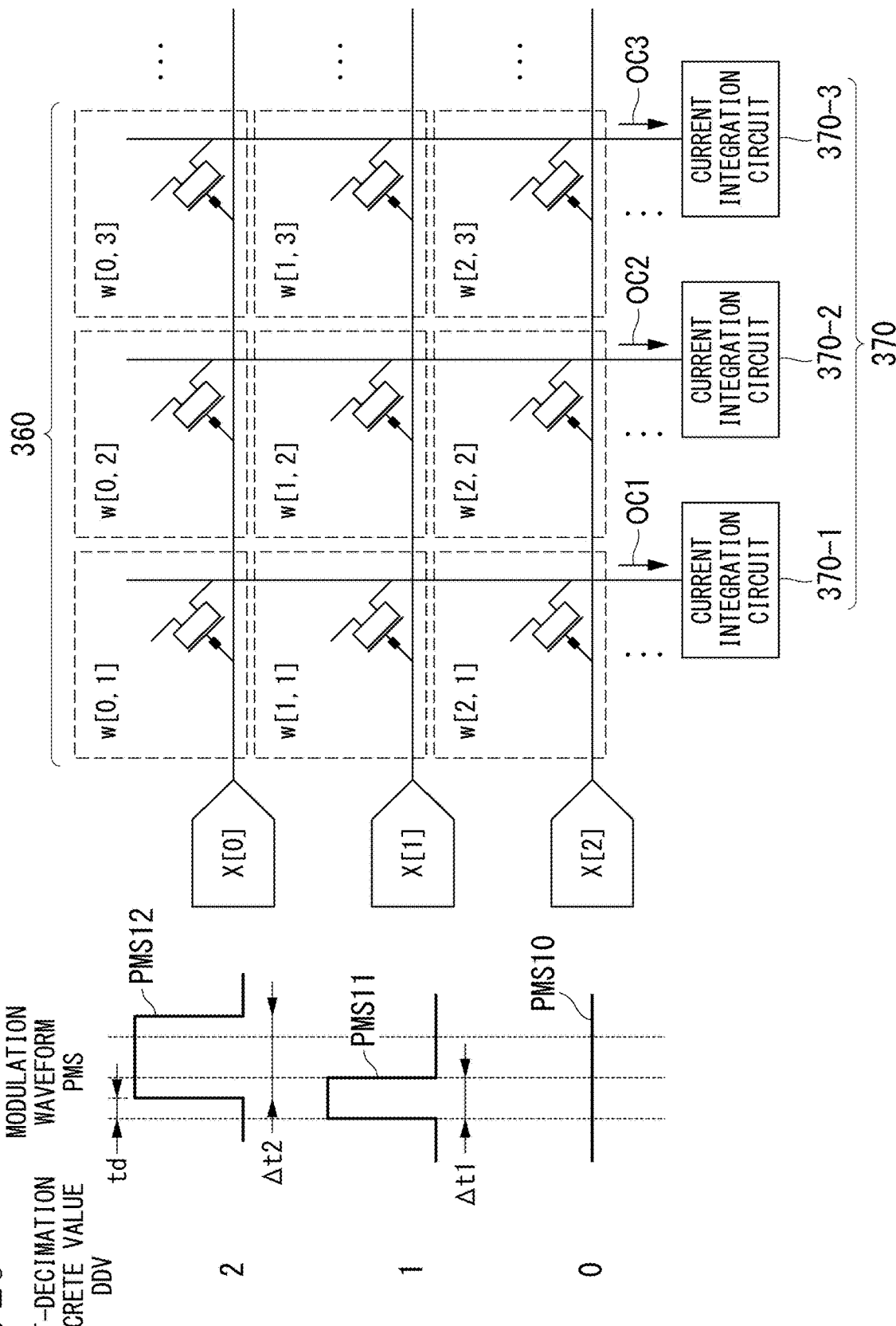
FIG. 20 is a diagram illustrating a modification example of the pulse width modulation signal that is supplied to the neuromorphic element of the embodiment.

FIG. 20 is a diagram illustrating a modification example of the pulse width modulation signal PMS that is supplied to the neuromorphic device 360 of the embodiment. The modification example is different from the above-described embodiment in that a function of adjusting a rising timing and a falling timing of the pulse width modulation signal PMS output by the PWM modulation circuit 350 is included.

Specifically, the decimation circuit 330 generates a plurality of decimation signals DS. The PWM modulation circuit 350 generates the pulse width modulation signal PMS corresponding to each of the plurality of decimation signals DS generated by the decimation circuit 330.

In this example, the decimation circuit 330 generates decimation signals DS0 to DS2. In the example illustrated in FIG. 20, the decimation signal DS0 indicates a value 0 (zero), the decimation signal DS1 indicates a value 1, and the decimation signal DS2 indicates a value 2. The PWM modulation circuit 350 generates a pulse width modulation signal PMS10 as the pulse width modulation signal PMS corresponding to the decimation signal DS0. Similarly, the PWM modulation circuit 350 generates a pulse width modulation signal PMS11 as the pulse width modulation signal PMS corresponding to the decimation signal DS1 and a pulse width modulation signal PMS12 as the pulse width modulation signal PMS corresponding to the decimation signal DS2. In the example illustrated in FIG. 20, a pulse width of the pulse width modulation signal PMS10 is 0 (zero). A pulse width of the pulse width modulation signal PMS11 is Δt1. Further, a pulse width of the pulse width modulation signal PMS12 is Δt2.

Here, the PWM modulation circuit 350 generates the pulse width modulation signals PMS10 to PMS12, with a change timing of a pulse of the pulse width modulation signal PMS11 being different from a change timing of a pulse of the pulse width modulation signal PMS12. Specifically, the PWM modulation circuit 350 generates the respective signals by setting a timing delayed by a delay time td from a rising timing of the pulse of the pulse width modulation signal PMS11 to a rising timing of the pulse of the pulse width modulation signal PMS12.

That is, the PWM modulation circuit 350 of the modification example shifts the rising timing and the falling timing of the pulse at which a signal waveform of the pulse width modulation signal PMS changes between the plurality of pulse width modulation signals PMS. With this configuration, the neural network device 300 can decrease a fluctuation (for example, generation of spike noise) in a power supply voltage when the signal waveform of the pulse width modulation signal PMS changes, as compared with a case in which the signal waveform changes between a plurality of pulse width modulation signals PMS at the same time. Therefore, the neural network device 300 can decrease generation of noise that adversely affects the integration result of the output current OC in the current integration circuit 370, and can improve the precision of the integration result of the output current OC.

Further, in recent years, in neuromorphic computing that imitates an information processing mechanism of a human brain, attention is paid to a spiking scheme as a method of more faithfully imitating signal propagation in synapses of a brain. In the spiking scheme, an input signal is expressed as a frequency of a pulse signal, and a synapse connection amplifies or decreases input pulse frequency information using a function of each of synapses having inhibitory or excitatory properties and outputs resultant information. The neuron is imitated to receive the plurality of synapse outputs and increases or decreases an activated state in the neuron on the basis of a time-series signal thereof. A pulse is output (fired) to a next stage at a moment when the activated state of each neuron exceeds a threshold value. The embodiment is also applicable to expressing inhibitory synapses in such a modeling method (modulation method). That is, an input signal generation circuit (a circuit at a place corresponding to the PWM modulation circuit 350 in the example of FIG. 14) may generate a signal modulated with the number of pulses per unit time, that is, a pulse frequency (a pulse frequency modulation signal) instead of a PWM modulation signal.

A frequency of the pulse signal may be regarded as the density of the pulse signal.

Here, a spiking neural network (SNN) is similar to a technique of deep learning (Deep Neural network) in that a brain is imitated in a graph structure, but is different in a neuron model in which what type of signals are input and output (encoded) to and from a synapse connection.

In the SNN, a spike signal and a firing model are used in order to perform imitation close to a model of propagation of a neuronal membrane potential of a brain nerve cell or an ion channel opening of a synapse connection. When the SNN is mounted digitally, there is, for example, a mounting method for performing modulation with a frequency of a pulse and so on, and when the SNN is mounted in an analog manner, there is, for example, a mounting method for combining integrators or charging and discharging elements using a capacitor (C) and so on.

Figure 28:
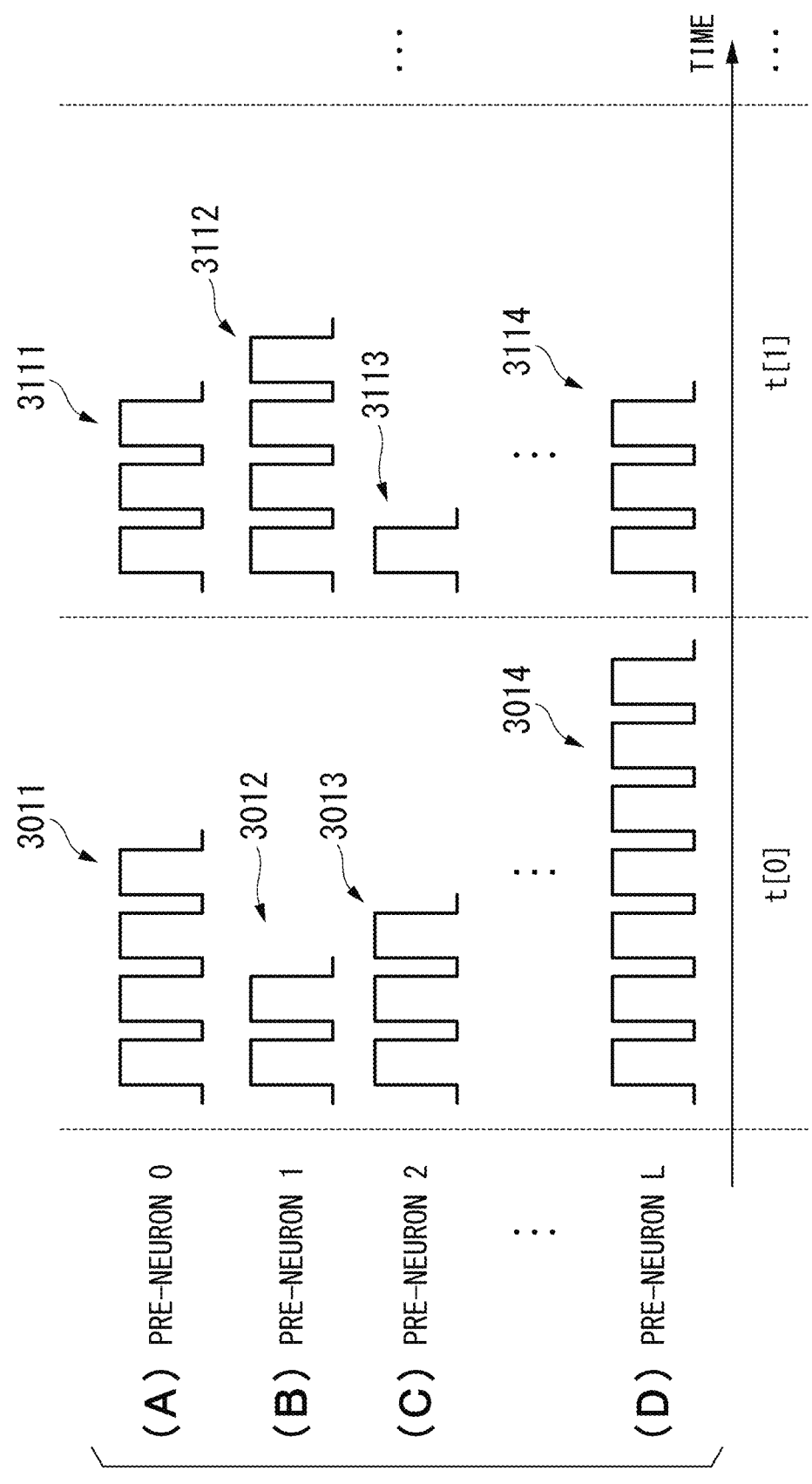
FIG. 28 is a diagram illustrating a specific example of a pulse frequency modulation signal according to the embodiment of the present invention.

FIG. 28 is a diagram illustrating a specific example of the pulse frequency modulation signal according to the embodiment of the present invention. In a graph illustrated in FIG. 28, a horizontal axis indicates time, and a vertical axis indicates a plurality of (L+1) pulse frequency modulation signals arranged side by side. In the example of FIG. 28, the respective (L+1) pulse frequency modulation signals correspond to (L+1) pre-neurons, that is, 0th to Lth pre-neurons.

Here, L is an integer equal to or greater than 1.

Time t[0], time t[1], . . . indicate time, and a time passes as the value in [ ] increases.

In the example of FIG. 28, the number of pulses of the pulse frequency modulation signal at each single time, such as time t[0] or time t[1], indicates a value of data.

As a specific example, at time t[0], (A) the value of the data corresponding to the pulse frequency modulation signal 3011 is 4, (B) the value of the data corresponding to the pulse frequency modulation signal 3012 is 2, (C) the value of the data corresponding to the pulse frequency modulation signal 3013 is 3, and (D) the value of the data corresponding to the pulse frequency modulation signal 3014 is 7.

Similarly, at time t[1], (A) the value of the data corresponding to the pulse frequency modulation signal 3111 is 3, (B) the value of the data corresponding to the pulse frequency modulation signal 3112 is 4, (C) the value of the data corresponding to the pulse frequency modulation signal 3113 is 1, and (D) the value of the data corresponding to the pulse frequency modulation signal 3114 is 3.

When the SNN is used, when an integration value of a plurality of values (in the example of FIG. 18, for example, output values (output currents OC1) from a plurality of variable resistance elements in a first column, output values (output currents OC2) from a plurality of variable resistance elements in a second column, . . . ) exceeds a threshold value, a digital spike signal is output.

When pulse frequency modulation is applied to the configuration illustrated in FIG. 14, a pulse frequency modulation circuit (a PFM modulation circuit) is used instead of the PWM modulation circuit 350.

The PFM modulation circuit generates a pulse frequency modulation signal having a pulse frequency (the number of pulses) depending on the magnitude of the value of the post-decimation discrete value DDV.

Specifically, when the post-decimation discrete value DDV of the decimation signal DS is 3, the PFM modulation circuit generates a pulse frequency modulation signal having the number of pulses of 3. When the post-decimation discrete value DDV of the decimation signal DS is 2, the PFM modulation circuit generates a pulse frequency modulation signal having the number of pulses of 2. When the post-decimation discrete value DDV of the decimation signal DS is 1, the PFM modulation circuit generates a pulse frequency modulation signal having the number of pulses of 1. When the post-decimation discrete value DDV of the decimation signal DS is 0 (zero), the PFM modulation circuit generates a pulse frequency modulation signal PMS having the pulse number of 0 (zero).

The PFM modulation circuit outputs the generated pulse frequency modulation signal to the neuromorphic device 360.

The neuromorphic device 360 outputs the output current OC, which is a weighted signal, on the basis of the pulse frequency modulation signal and a preset weight.

MODIFICATION EXAMPLE (PART 2)

Figures 21, 22:
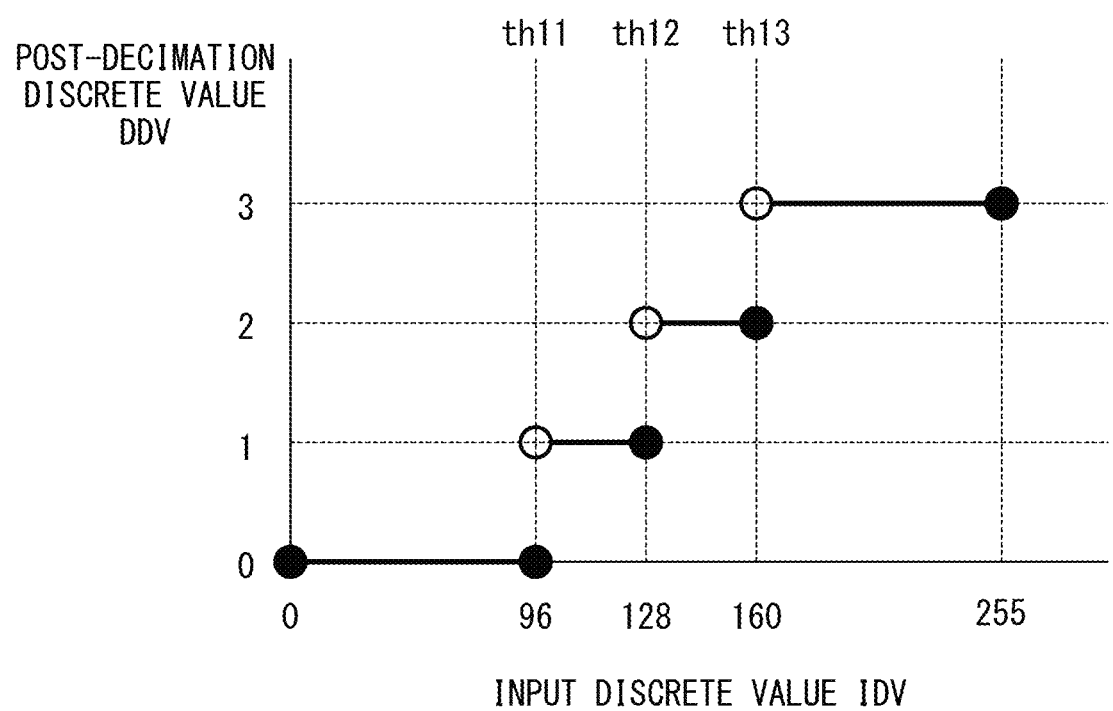
FIG. 21 is a diagram illustrating a modification example of the threshold value that is referred to by the decimation circuit of the embodiment.
FIG. 22 is a diagram illustrating a modification example of the discrete value conversion in the decimation circuit of the embodiment.

FIG. 21 is a diagram illustrating a modification example of the threshold value th that is referred to by the decimation circuit 330 of the embodiment.

FIG. 22 is a diagram illustrating a modification example of discrete value conversion in the decimation circuit 330 of the embodiment.

In the above-described embodiment, the threshold value th divides the input discrete value IDV equally (for example, into four) (see FIGS. 15 and 16). The modification example is different from the above-described embodiment in that the threshold value th unequally divides the input discrete value IDV.

In this example, threshold values th11 to th13 for dividing the quantization step number (256 steps) of the input signal IS into four are set. More specifically, a threshold value th11 is set to a value 96. In this case, when the input discrete value IDV is equal to or less than the threshold value th11 (that is, equal to or less than the value 96), the decimation circuit 330 converts the discrete value with the post-decimation discrete value DDV being 0 (zero). Similarly, the decimation circuit 330 converts the input discrete value IDV to the post-decimation discrete value DDV with a value of a threshold value th12 (for example, a value 128) and a value of a threshold value th13 (for example, a value 160) being as determination threshold values.

That is, when the input discrete value IDV is 0 to 96, the decimation circuit 330 sets the post-decimation discrete value DDV to 0 (zero). When the input discrete value IDV is 97 to 128, the decimation circuit 330 sets the post-decimation discrete value DDV to 1. When the input discrete value IDV is 129 to 160, the decimation circuit 330 sets the post-decimation discrete value DDV to 2. When the input discrete value IDV is 161 to 255, the decimation circuit 330 sets the post-decimation discrete value DDV to 3.

Here, when information that is a sensing target of the sensing device 310 is converted to the input signal IS, a range of the input discrete value IDV having a relatively large amount of information and a range of the input discrete value IDV having a relatively small amount of information may be generated.

For example, when the information that is a sensing target of the sensing device 310 is the image, a pixel value (for example, brightness of the pixel) output by a pixel of the image sensor is converted to the input discrete value IDV. Specifically, when the information that is a sensing target is the image as illustrated in FIG. 4, the brightness of the image is converted with using a gray scale of 255 gradations. For example, a portion in which the brightness of the image is 0 (for example, completely black) is converted to the input discrete value IDV of 0 (zero), and a portion in which the brightness of the image is 255 (for example, completely white) is converted to the input discrete value IDV of 255. In this case, in the neural network device 300, for example, when a shape of a letter (a numeral) shown in the image or a meaning thereof is analyzed, information on an outline portion in which the image is switched between black and white may be relatively significant, and information such as a change in brightness of other portions (for example, a black background portion or a white portion in a letter (a numeral)) may be relatively insignificant. It can be said that, when information on a portion in which the image is switched between white and black is significant as in this example, information on a portion in a range from 97 to 160 (for example, light gray to dark gray) in which the image is switched between white and black in the range of the input discrete value IDV of 256 steps is relatively significant, and an amount of information is large. Further, in the case of this example, it can be said that information on portions in a range from 0 to 96 (for example, completely white to light gray) and a range from 161 to 255 (for example, dark gray to completely black) in the range of the input discrete value IDV of 256 steps is relatively insignificant, and an amount of information is small.

The threshold value th of the modification example divides the quantization step number of the input signal IS into ranges having unequal widths. In the above example, a width between the threshold values th is set to be relatively narrow in a relatively significant range (for example, a range from 97 to 160) in the range of the input discrete value IDV, and a width between the threshold values th is set to be relatively wide in a relatively insignificant range (for example, a range from 0 to 96 and a range from 161 to 255). Therefore, according to the neural network device 300 of the modification example, more significant information among pieces of information included in the input signal IS can be included in the decimation signal DS.

Here, for example, when the number of threshold values th is increased and an interval between the threshold values th is narrowed, the more significant information among the pieces of information included in the input signal IS can be included in the decimation signal DS.

However, when the number of threshold values th is increased, the quantization step number of the decimation signal DS is increased and the pulse width of the pulse width modulation signal PMS is increased. Therefore, the above-described problem such as the increase in calculation time or susceptibleness to noise occurs.

According to the neural network device 300 of the modification example, the more significant information among the pieces of information included in the input signal IS can be included in the decimation signal DS without an increase in the number of threshold values th. That is, the neural network device 300 can include more significant information in the decimation signal DS while curbing an increase in the quantization step number of the decimation signal DS.

MODIFICATION EXAMPLE (PART 3)

Figures 23, 24:
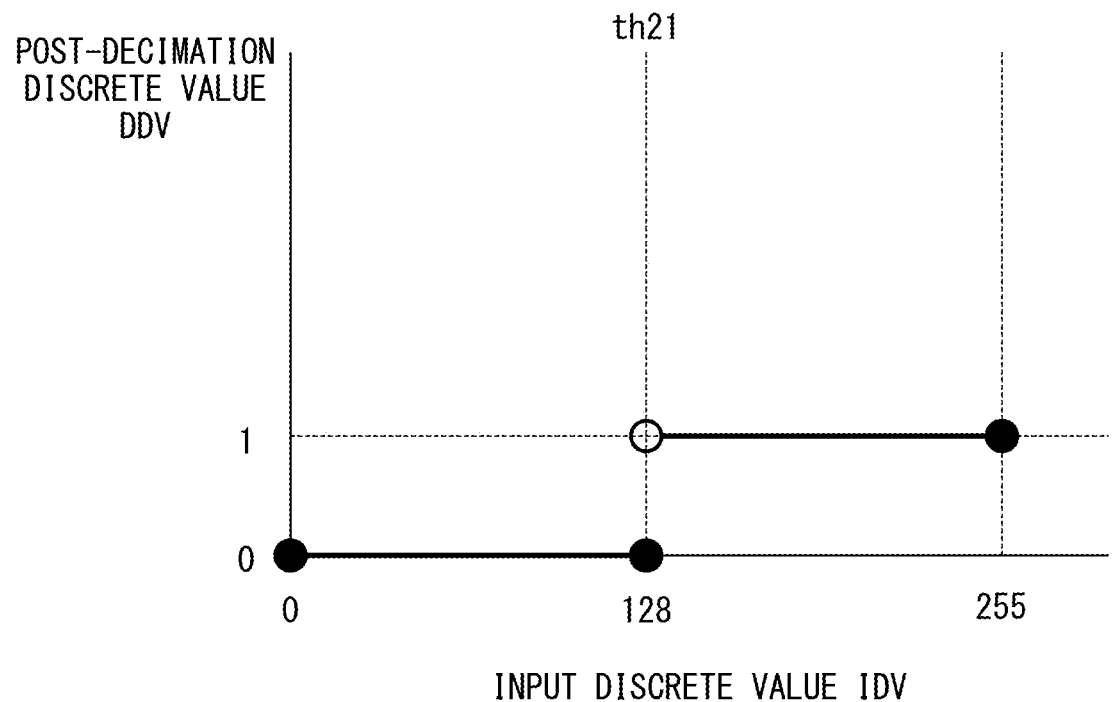
FIG. 23 is a diagram illustrating a second modification example of the threshold value that is referred to by the decimation circuit of the embodiment.
FIG. 24 is a diagram illustrating a second modification example of the discrete value conversion in the decimation circuit of the embodiment.

FIG. 23 is a diagram illustrating a second modification example of the threshold value th that is referred to by the decimation circuit 330 of the embodiment.

FIG. 24 is a diagram illustrating a second modification example of the discrete value conversion in the decimation circuit 330 of the embodiment.

In the above-described embodiment, the input discrete value IDV is divided (for example, divided into four) depending on a plurality of threshold values th (see FIGS. 15 and 16). The modification example is different from the above-described embodiment in that the input discrete value IDV is divided into two depending on a single threshold value th.

That is, the decimation circuit 330 of the modification example generates a binary decimation signal DS by dividing the quantization step number of the input signal IS into two. In a specific example illustrated in FIG. 23, a threshold value th21 for dividing the quantization step number (256 steps) of the input signal IS into two is set. In this case, the decimation circuit 330 converts the discrete value, with the post-decimation discrete value DDV being 0 (zero) when the input discrete value IDV is equal to or less than the threshold value th21 (that is, equal to or less than a value 128), and with the post-decimation discrete value DDV being 1 when the input discrete value IDV exceeds the threshold value th21 (that is, is equal to or greater than a value 129).

Figure 25:
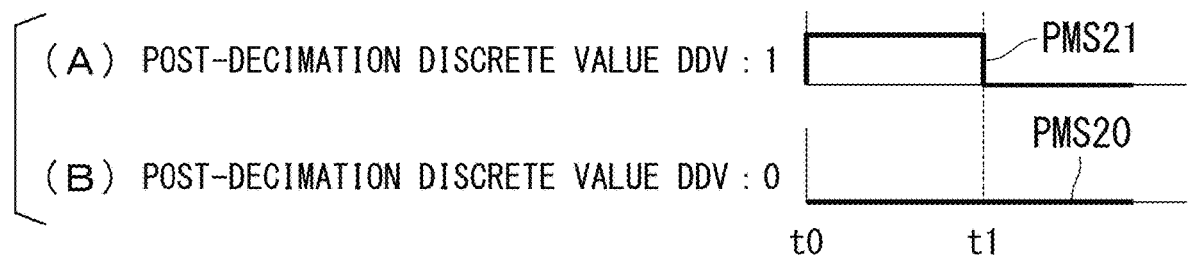
FIG. 25 is a diagram illustrating a modification example of the pulse width modulation in the PWM modulation circuit of the embodiment.

FIG. 25 is a diagram illustrating a modification example of the pulse width modulation in the PWM modulation circuit 350 of the embodiment. The PWM modulation circuit 350 generates the pulse width modulation signal PMS having a pulse width depending on the magnitude of the value of the post-decimation discrete value DDV. In the case of this modification example, the PWM modulation circuit 350 generates a binary pulse width modulation signal PMS depending on the decimation signal DS, that is, a pulse width modulation signal PMS20 having a pulse width of 0 (zero) and a pulse width modulation signal PMS21 having a pulse width of $\Delta t1$. The PWM modulation circuit 350 supplies the generated pulse width modulation signal PMS to the neuromorphic device 360.

Figure 26:
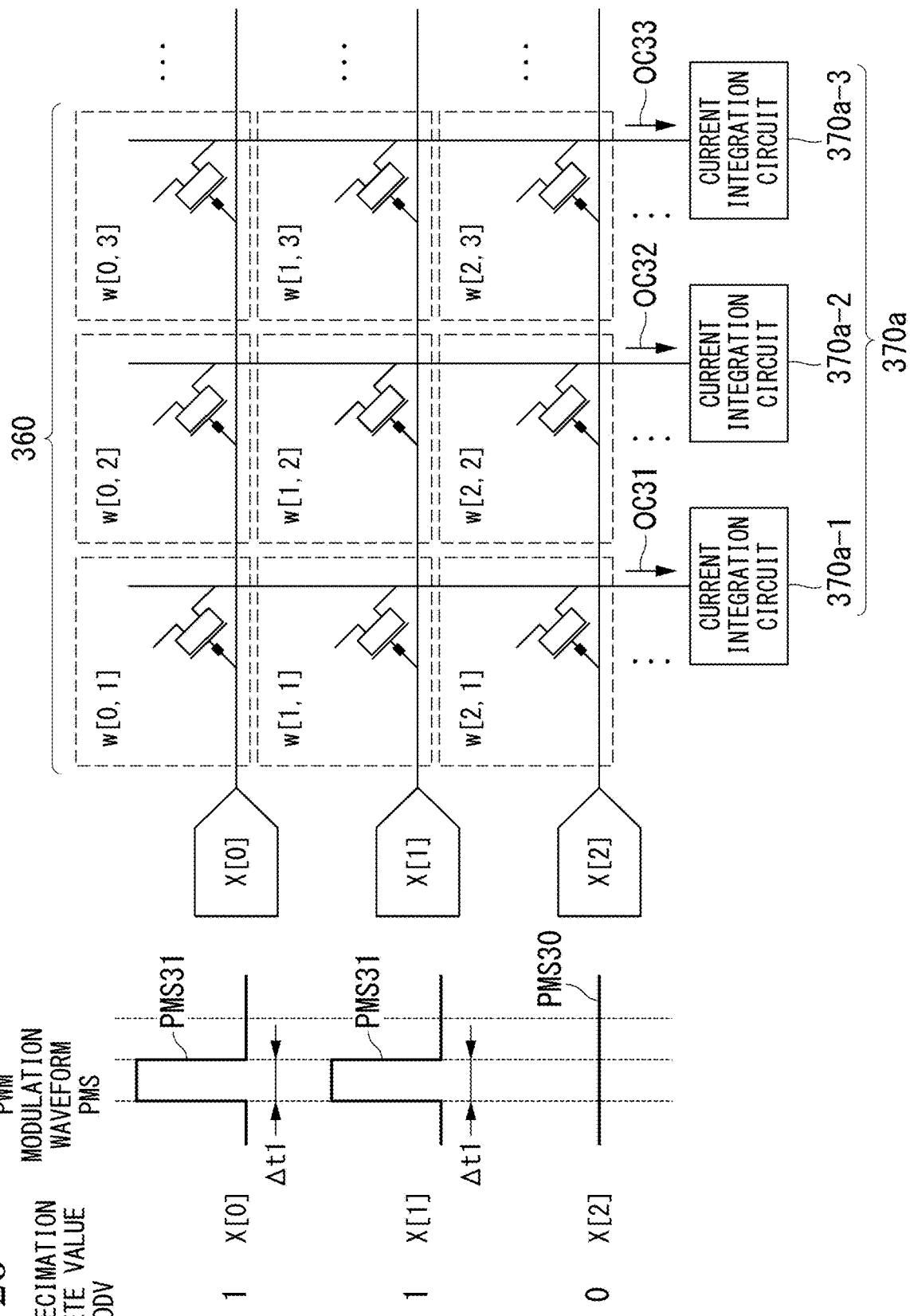
FIG. 26 is a diagram illustrating a modification example of the pulse width modulation signal that is supplied to the neuromorphic element of the embodiment.

FIG. 26 is a diagram illustrating a modification example of the pulse width modulation signal PMS that is supplied to the neuromorphic device 360 of the embodiment. In this example, a pulse width modulation signal PMS31 having the pulse width 1 is supplied as the input signal X[0] and the input signal X[1] to the neuromorphic device 360, and a pulse width modulation signal PMS30 having the pulse width 0 is supplied as the input signal X[2] to the neuromorphic device 360.

The neuromorphic device 360 multiplies the input signal X[0] by a weight w[0, 1], a weight w[0, 2], and a weight w[0, 3] and output the output current OC, as in the case described with reference to FIG. 19. Similarly, the neuromorphic device 360 multiplies the input signal X[1] by a weight w[1,1], a weight w[1,2], and a weight w[1,3] and outputs the output current OC. The neuromorphic device 360 multiplies the input signal X[2] by a weight w[2,1], a weight w[2,2], and a weight w[2,3] and outputs the output current OC.

Here, the pulse width of the supplied pulse width modulation signal PMS has only two values (for example, a pulse width 0 (zero)) and $\Delta t1$) in the neuromorphic device 360 of the modification example, unlike the case described with reference to FIG. 19. Therefore, the current integration circuit 370 may detect the presence or absence of a pulse (that is, a magnitude of a current value of the output current OC) without integrating (time-integrating) the pulse width.

That is, in the modification example, the neural network device 300 includes a current detection circuit 370a instead of the current integration circuit 370. This current detection circuit 370a detects the magnitude of the current value of the output current OC. Specifically, a current detection circuit 370a-1 detects a current magnitude of an output current OC31, as illustrated in FIG. 26. A current detection circuit 370a-2 detects a current magnitude of an output current OC32. A current detection circuit 370a-3 detects a current magnitude of an output current OC33.

In general, the detection of the magnitude of the current can be realized by a simpler circuit than that for integration of the current (or in a combination with simpler software). That is, the neural network device 300 of the modification example can detect an output result of the neuromorphic device 360 with a simpler configuration.

Further, when the integration time of the output current OC in the current integration circuit 370 becomes long as described above, it is easy for the precision of the integration result to be degraded due to an influence of noise component. According to the neural network device 300 of the modification example, since it is not necessary to integrate the output current OC, the integration result is not susceptible to the noise component included in the output current OC. A scheme for averaging a plurality of current detection values can be applied for further reduction in noise. Therefore, according to the neural network device 300 of the modification example, it is possible to curb the degradation of the precision of the integration result.

When the threshold value th is determined so that the post-decimation discrete value DDV obtained by dividing the input discrete value IDV into "0 (zero)" and "1" is output as described above, the neuromorphic device 360 may be configured as a so-called binarized neural network (hereinafter also referred to as a binarizing NN).

Even when the neuromorphic device 360 is configured as the binarizing NN, the neuromorphic device 360 can adjust the weight w and the resolution on the basis of the output current OC output by the neuromorphic device 360 and obtain the same level of identification performance as that of a multi-valued neural network in a learning step.

Further, the threshold value th may be variably determined on the basis of the value of the input signal IS. When the information that is the sensing target of the sensing device 310 is the image as described above, the pixel value (for example, the brightness of the pixel) output by the pixel of the image sensor is converted to the input discrete value IDV. Here, the brightness of the image captured by the image sensor may fluctuate depending on, for example, a type of the image or imaging conditions. Therefore, a range including a more meaning of the image in the range of the input discrete value IDV, that is, a relatively significant range may also fluctuate. Even in such a case, since the threshold value th is variably determined on the basis of the value of the input signal IS, the more significant information among the pieces of information included in the input signal IS can be included in the decimation signal DS according to the neural network device 300 of the modification example.

Further, the step number of the discrete value of the decimation signal DS generated by the decimation circuit 330 may be variably determined on the basis of the input signal IS. Here, the range including a more meaning of the image in the range of the input discrete value IDV, that is, a relatively significant range may fluctuate depending on a value or type of the input signal IS. Even in such a case, since the threshold value th is variably determined on the basis of the value of the input signal IS, the more significant information among the pieces of information included in the input signal IS can be included in the decimation signal DS according to the neural network device 300 of the modification example.

As described above, the step number of the discrete value of the decimation signal DS generated by the decimation circuit 330 is determined to be in a range of the step number smaller than the quantization step number of the input signal IS. That is, in the case of this example, the step number of the discrete value of the decimation signal DS generated by the decimation circuit 330 is changed and determined on the basis of the value of the input signal in the range of the step number smaller than the quantization step number of the input signal IS.

Further, the neuromorphic element of the neuromorphic device 360 according to the embodiment does not have a change characteristic of the complete analog linear conductance (G) and has a finite resolution (in other words, the step number of the discrete value), as described above. The decimation circuit 330 may determine the step number of the discrete value of the decimation signal DS on the basis of the step number of discrete values of the neuromorphic element. For example, the decimation circuit 330 may set the step number of the discrete value of the decimation signal DS to be a step number smaller than the step number of the discrete value of the neuromorphic element.

With such a configuration, according to the neural network device 300 of the embodiment, even when the quantization step number (quantization bits) of the input signal IS is relatively large, the integration time of the output current OC in the current integration circuit 370 can be decreased.

A program for realizing a function of each device (for example, the control device 11 and the neural network device 300) according to the embodiments described above may be recorded on a computer-readable recording medium (storage medium), and the program recorded on this recording medium may be loaded into and executed by a computer system so that a process is performed.

Here, the "computer system" may include an operating system (OS) or hardware such as a peripheral device.

Further, the "computer-readable recording medium" refers to a flexible disk, a magneto-optical disc, a read only memory (ROM), a writable nonvolatile memory such as a flash memory, a portable medium such as a digital versatile disc (DVD), or a storage device such as a hard disk built into the computer system. Further, the recording medium may be, for example, a recording medium on which data is temporarily recorded.

Further, the "computer-readable recording medium" may also include a recording medium that holds a program for a certain period of time, such as a volatile memory (for example, a dynamic random access memory (DRAM)) inside a computer system including a server or a client when the program is transmitted over a network such as the Internet or a communication line such as a telephone line.

Further, the program may be transmitted from a computer system in which the program is stored in a storage device or the like to other computer systems via a transfer medium or by transfer waves in the transfer medium. Here, the "transfer medium" for transferring the program refers to a medium having a function of transferring information, such as a network (communication network) such as the Internet or a communication line such as a telephone line.

Further, the program may be a program for realizing some of the above-described functions. Further, the program may be a program capable of realizing the above-described functions in combination with a program previously stored in the computer system, that is, a so-called differential file (differential program).

Example of Configuration

As an example of a configuration, a control device (the control device 11 in the embodiment) for an array (the element array 121 in the embodiment) including a neuromorphic element that multiplies a signal by a weight depending on a value of a variable characteristic (for example, conductance) is a control device including a control unit (which is a function of the control device 11, such as the weight assignment control unit 23, in the embodiment) that controls characteristics of the neuromorphic element using a discretization step size obtained so that a predetermined condition (a predetermined condition for decreasing an error or a predetermined condition for increasing precision) is satisfied on the basis of a case in which a true value of a weight obtained with higher precision than the resolution of the characteristics of the neuromorphic element (a true value calculated by the real number simulator in the embodiment) has been used and a case in which a discretization step size (the parameters α and β corresponding to the discretization step size in the embodiment) set for the characteristics of the neuromorphic element have been used.

As one example of the configuration, in the control device, the control unit controls the characteristics of the neuromorphic element using the dynamic range of the neuromorphic element depending on the discretization step size, the resolution, and the predetermined offset amount.

As one example of the configuration, in the control device, when the array has a plurality of layers each including a neuromorphic element, the control unit controls characteristics of the neuromorphic element using a common discretization step size for each of the layers.

As one example of the configuration, in the control device, when the array has a layer including a plurality of neuromorphic elements, the control unit controls the characteristics of the neuromorphic element using a common discretization step size for each of groups into which the plurality of neuromorphic elements included in the same layer are grouped.

As one example of the configuration, in the control device, the array has a plurality of layers including neuromorphic elements, the neuromorphic element having a common resolution for each of the layers is included, and the resolutions of the neuromorphic elements in the different layers are different.

As one example of the configuration, in the control device, the control unit (which is a function of the control device 11, such as the identification control unit 21, the weight calculation control unit 22, and the weight assignment control unit 23, in the embodiment) performs learning on the array using the discretization step size.

As one example of the configuration, in the control device, the array includes a circuit that performs a product-sum calculation in a neural network using a neuromorphic element.

As an example of a configuration, a calculation method for calculating a discretization step size of characteristics of a neuromorphic element (for example, a calculation method that is performed by the weight calculation control unit 22 of the control device 11 or another computer) for an array including a neuromorphic element that multiplies a signal by a weight depending on a value of a variable characteristic is a discretization step size calculation method including a step of calculating a true value of the weight with a higher precision than a resolution of characteristics of the neuromorphic element, and a step of calculating the discretization step size so that a predetermined condition (a predetermined condition for reducing an error or a predetermined condition for increasing precision) is satisfied, on the basis of a case in which the true value of the weight is used and a case in which the discretization step size set for the characteristics of the neuromorphic element is used.

As an example of a configuration, a program for calculating a discretization step size of characteristics of a neuromorphic element (for example, a program that is performed by a computer constituting the weight calculation control unit 22 of the control device 11 or another computer) for an array including a neuromorphic element that multiplies a signal by a weight depending on a value of a variable characteristic is a program for causing a computer to execute a step of calculating a true value of the weight with a higher precision than a resolution of characteristics of the neuromorphic element, and a step of calculating the discretization step size so that a predetermined condition (a predetermined condition for reducing an error or a predetermined condition for increasing precision) is satisfied, on the basis of a case in which the true value of the weight is used and a case in which the discretization step size set for the characteristics of the neuromorphic element is used.

Here, in the computer, for example, a processor such as a central processing unit (CPU) reads and executes a program stored in a memory.

An example of a configuration using a pulse width modulation signal will be described.

As one example of the configuration, a neural network device includes a decimation unit configured to convert a discrete value of an input signal to a discrete value having a smaller step number than a quantization step number of the input signal on the basis of a predetermined threshold value to generate a decimation signal; a modulation unit configured to perform pulse width modulation on a discrete value of the decimation signal generated by the decimation unit to generate a pulse width modulation signal indicating the discrete value of the decimation signal using a pulse width; and a weighting unit including a neuromorphic element configured to output a weighted signal obtained by weighting the pulse width modulation signal through multiplication of the pulse width modulation signal generated by the modulation unit by a weight depending on a value of a variable characteristic.

As one example of the configuration, in the neural network device, the decimation unit generates respective decimation signals corresponding to a plurality of input signals, and the modulation unit generates the pulse width modulation signals corresponding to the plurality of respective decimation signals generated by the decimation unit, with change timings of signal waveforms being different from each other.

As one example of the configuration, in the neural network device, the decimation unit generates a binary decimation signal by dividing the quantization step number of the input signal into two, the modulation unit generates a binary pulse width signal depending on the decimation signal, the weighting unit outputs a weighted signal obtained by weighting the binary pulse width modulation signal, and a current detection unit that detects a magnitude of a current of the weighted signal output by the weighting unit is further included.

Further, it is also possible to provide a signal generation method or a program having the same feature as the above-described neural network device.

An example of a configuration using the pulse frequency modulation signal is shown.

As one example of the configuration, a neural network device includes a decimation unit configured to convert a discrete value of an input signal to a discrete value having a smaller step number than a quantization step number of the input signal on the basis of a predetermined threshold value to generate a decimation signal; a modulation unit configured to perform pulse frequency modulation on a discrete value of the decimation signal generated by the decimation unit to generate a pulse frequency modulation signal indicating the discrete value of the decimation signal using a pulse frequency; and a weighting unit including a neuromorphic element configured to output a weighted signal obtained by weighting the pulse frequency modulation signal through multiplication of the pulse frequency modulation signal generated by the modulation unit by a weight depending on a value of a variable characteristic.

As one example of the configuration, in the neural network device, the decimation unit generates respective decimation signals corresponding to a plurality of input signals, and the modulation unit generates the pulse frequency modulation signals corresponding to the plurality of respective decimation signals generated by the decimation unit, with change timings of signal waveforms being different from each other.

As one example of the configuration, in the neural network device, the decimation unit generates a binary decimation signal by dividing the quantization step number of the input signal into two, the modulation unit generates a binary pulse frequency signal depending on the decimation signal, the weighting unit outputs a weighted signal obtained by weighting the binary pulse frequency modulation signal, and a current detection unit that detects a magnitude of a current of the weighted signal output by the weighting unit is further included.

Further, it is also possible to provide a signal generation method or a program having the same feature as the above-described neural network device.

The embodiments of the present invention have been described in detail above with reference to the drawings, but a specific configuration is not limited to the embodiments, and design changes and the like without departing from the gist of the present invention are included.

According to the neural network device, the signal generation method, and the program of the present invention, it is possible to curb an increase in calculation time when neuromorphic elements are used for product-sum calculation in a neural network.

EXPLANATION OF REFERENCES

1 Neural network system
11 Control device
12 Element array unit
21 Identification control unit
22 Weight calculation control unit
23 Weight assignment control unit
24 Storage unit
101 Neural network circuit
111 Identification control circuit
112 Weight calculation control circuit
113 Weight assignment control circuit
121 Element array
122, 123 Input and output IF circuit
211 Image (image data)
1011, 1111 to 1113, 1121 to 1123, 1211, 1311 to 1313, 1321 to 1323, 1411 to 1413, 1421 to 1423, 1511 to 1513, 1521 to 1523, 1611 to 1613, 1621 to 1623, 1711 Characteristics
1311, 1132 Range
1221, 1721 Arrow
A1-0 to A1-$p$, A1-$i$, A2-0 to A2-$q$, A2-$j$, A3-1 to A3-$r$, A3-$k$ Unit
B1-1 to B1-$n$, B2-1 to B2-$n$, B0-1 to B0-$n$ Image
300 Neural network device
310 Sensing device
320 AD converter
330 Decimation circuit (decimation unit)
340 Threshold value acquisition unit
350 PWM modulation circuit (modulation unit)
360 Neuromorphic device (weighting unit)
370 Current integration (current integration unit)
370$a$ Current detection circuit (current detection unit)
3011 to 3014, 3111 to 3114 Pulse frequency modulation signal
IS Input signal
DS Decimation signal
IDV Input discrete value (discrete value of input signal)
DDV Post-decimation discrete value (discrete value of decimation signal)
PMS Pulse width modulation signal
OC Output current (weighted signal)
th Threshold value
LA1 Input layer
LA2 Hidden layer
LA3 Output layer
RA1 First layer setting range
RA2 Second layer setting range

What is claimed is:

1. A neural network device comprising:
a processor configured to:
convert a discrete value of an input signal to a discrete value having a smaller step number than a quantization step number of the input signal based on a predetermined threshold value to generate a decimation signal;
modulate a discrete value of the decimation signal to generate a modulation signal indicating the discrete value of the decimation signal; and
output a weighted signal obtained by weighting the modulation signal through multiplication of the modulation signal by a weight according to a value of a variable characteristic with a neuromorphic element.

2. The neural network device according to claim 1, wherein the threshold value is determined based on a weighting result of the weighted signal.

3. The neural network device according to claim 2, wherein the processor is configured to perform pulse width modulation on the discrete value of the decimation signal to generate a pulse width modulation signal indicating the discrete value of the decimation signal using a pulse width.

4. The neural network device according to claim 3, wherein the processor is configured to:
generate the decimation signals corresponding to a plurality of the respective input signals, and
generate the modulation signals corresponding to the plurality of respective decimation signals, with change timings of signal waveforms different from each other.

5. The neural network device according to claim 2, wherein the processor is configured to perform pulse frequency modulation on the discrete value of the decimation signal to generate a pulse frequency modulation signal indicating the discrete value of the decimation signal using a pulse frequency.

6. The neural network device according to claim 5, wherein the processor is configured to:
generate the decimation signals corresponding to a plurality of the respective input signals, and
generate the modulation signals corresponding to the plurality of respective decimation signals, with change timings of signal waveforms different from each other.

7. The neural network device according to claim 2, wherein the processor is configured to:
generate the decimation signals corresponding to a plurality of the respective input signals, and generate the modulation signals corresponding to the plurality of respective decimation signals, with change timings of signal waveforms different from each other.

8. The neural network device according to claim 2, wherein the threshold value divides the quantization step number of the input signal into ranges having unequal widths.

9. The neural network device according to claim 1, wherein the processor is configured to perform pulse width modulation on the discrete value of the decimation signal to generate a pulse width modulation signal indicating the discrete value of the decimation signal using a pulse width.

10. The neural network device according to claim 9, wherein the processor is configured to:
generate the decimation signals corresponding to a plurality of the respective input signals, and
generate the modulation signals corresponding to the plurality of respective decimation signals, with change timings of signal waveforms different from each other.

11. The neural network device according to claim 1, wherein the processor is configured to perform pulse frequency modulation on the discrete value of the decimation signal to generate a pulse frequency modulation signal indicating the discrete value of the decimation signal using a pulse frequency.

12. The neural network device according to claim 11, wherein the processor is configured to:
generate the decimation signals corresponding to a plurality of the respective input signals, and
generate the modulation signals corresponding to the plurality of respective decimation signals, with change timings of signal waveforms different from each other.

13. The neural network device according to claim 1, wherein the processor is configured to:
generate the decimation signals corresponding to a plurality of the respective input signals, and
generate the modulation signals corresponding to the plurality of respective decimation signals, with change timings of signal waveforms different from each other.

14. The neural network device according to claim 1, wherein the threshold value divides the quantization step number of the input signal into ranges having unequal widths.

15. The neural network device according to claim 1, wherein the processor is configured to:
divide the quantization step number of the input signal into two to generate a binary decimation signal,
generate a binary modulation signal according to the decimation signal,
output the weighted signal obtained by weighting the binary modulation signal, and
detect a magnitude of a current of the weighted signal.

16. The neural network device according to claim 1, wherein the processor is further configured to:
acquire the threshold value to be used for generation of the decimation signal.

17. The neural network device according to claim 1, wherein the threshold value is variably determined based on the input signal.

18. The neural network device according to claim 1, wherein a step number of the discrete value of the decimation signal is variably determined based on a value of the input signal in a range of the smaller step number than the quantization step number of the input signal.

19. A signal generation method comprising:
converting a discrete value of an input signal to a discrete value having a smaller step number than a quantization step number of the input signal based on a predetermined threshold value to generate a decimation signal;
modulating a discrete value of the decimation signal to generate a modulation signal indicating the discrete value of the decimation signal; and
outputting a weighted signal in which the modulation signal is weighted by a neuromorphic element by multiplying the modulation signal by a weight according to a value of a variable characteristic.

20. A non-transitory computer readable medium storing a program for causing a computer included in a neural network device to execute:
converting a discrete value of an input signal to a discrete value having a smaller step number than a quantization step number of the input signal based on a predetermined threshold value to generate a decimation signal;
modulating a discrete value of the decimation signal to generate a modulation signal indicating the discrete value of the decimation signal; and
supplying the modulation signal to a neuromorphic element that outputs a weighted signal obtained by weighting the modulation signal through multiplication of the modulation signal by a weight according to a value of a variable characteristic, to cause the weighted signal to be output.

* * * * *